(12) United States Patent
Kirchhoffer et al.

(10) Patent No.: US 10,123,025 B2
(45) Date of Patent: Nov. 6, 2018

(54) CODING OF SIGNIFICANCE MAPS AND TRANSFORM COEFFICIENT BLOCKS

(71) Applicant: GE Video Compression, LLC, Albany, NY (US)

(72) Inventors: Heiner Kirchhoffer, Berlin (DE); Heiko Schwarz, Panketal (DE); Tung Nguyen, Berlin (DE); Detlev Marpe, Berlin (DE); Thomas Wiegand, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 0 days.

(21) Appl. No.: 15/940,820

(22) Filed: Mar. 29, 2018

(65) Prior Publication Data

US 2018/0220137 A1  Aug. 2, 2018

Related U.S. Application Data

(63) Continuation of application No. 15/200,300, filed on Jul. 1, 2016, now Pat. No. 9,998,741, which is a
(Continued)

(30) Foreign Application Priority Data

Apr. 13, 2010 (EP) .................................... 10159766
Apr. 13, 2010 (WO) ................. PCT/EP2010/054822

(51) Int. Cl.
*H04N 19/18* (2014.01)
*H04N 19/59* (2014.01)
(Continued)

(52) U.S. Cl.
CPC ........... *H04N 19/18* (2014.11); *H04N 19/124* (2014.11); *H04N 19/129* (2014.11); *H04N 19/13* (2014.11);
(Continued)

(58) Field of Classification Search
CPC ...... H04N 19/18; H04N 19/136; H04N 19/70; H04N 19/46; H04N 19/13; H04N 19/129;
(Continued)

(56) References Cited

U.S. PATENT DOCUMENTS

| 5,021,891 A | 6/1991 | Lee |
| 5,949,912 A | 9/1999 | Wu |

(Continued)

FOREIGN PATENT DOCUMENTS

| CN | 101039430 A | 9/2007 |
| CN | 101521645 A | 9/2009 |

(Continued)

OTHER PUBLICATIONS

Notice of Allowance towards corresponding U.S. Appl. No. 15/828,756 dated Mar. 8, 2018.
(Continued)

*Primary Examiner* — Joseph Suh
(74) *Attorney, Agent, or Firm* — Pillsbury Winthrop Shaw Pittman, LLP

(57) ABSTRACT

A higher coding efficiency for coding a significance map indicating positions of significant transform coefficients within a transform coefficient block is achieved by the scan order by which the sequentially extracted syntax elements indicating, for associated positions within the transform coefficient block, as to whether at the respective position a significant or insignificant transform coefficient is situated, are sequentially associated to the positions of the transform coefficient block, among the positions of the transform coefficient block depends on the positions of the significant transform coefficients indicated by previously associated syntax elements. Alternatively, the first-type elements may be context-adaptively entropy decoded using contexts which are individually selected for each of the syntax elements
(Continued)

dependent on a number of significant transform coefficients in a neighborhood of the respective syntax element, indicated as being significant by any of the preceding syntax elements.

30 Claims, 9 Drawing Sheets

Related U.S. Application Data continuation of application No. 13/648,538, filed on Oct. 10, 2012, now Pat. No. 9,894,368, which is a continuation of application No. PCT/EP2011/055644, filed on Apr. 11, 2011.

(51) Int. Cl.

| | | |
|---|---|---|
| *H04N 19/124* | (2014.01) | |
| *H04N 19/139* | (2014.01) | |
| *H04N 19/51* | (2014.01) | |
| *H04N 19/91* | (2014.01) | |
| *H04N 19/136* | (2014.01) | |
| *H04N 19/61* | (2014.01) | |
| *H04N 19/129* | (2014.01) | |
| *H04N 19/13* | (2014.01) | |
| *H04N 19/46* | (2014.01) | |
| *H04N 19/70* | (2014.01) | |
| *H04N 19/176* | (2014.01) | |
| *H04N 19/50* | (2014.01) | |

(52) U.S. Cl.
CPC ......... *H04N 19/136* (2014.11); *H04N 19/139* (2014.11); *H04N 19/176* (2014.11); *H04N 19/46* (2014.11); *H04N 19/50* (2014.11); *H04N 19/51* (2014.11); *H04N 19/59* (2014.11); *H04N 19/61* (2014.11); *H04N 19/70* (2014.11); *H04N 19/91* (2014.11)

(58) Field of Classification Search
CPC ...... H04N 19/59; H04N 19/176; H04N 19/50; H04N 19/91; H04N 19/51; H04N 19/139; H04N 19/124; H04N 19/61
See application file for complete search history.

(56) References Cited

U.S. PATENT DOCUMENTS

| | | | | |
|---|---|---|---|---|
| 6,002,812 | A | 12/1999 | Cho | |
| 6,611,620 | B1* | 8/2003 | Kobayashi | H04N 19/593 |
| | | | | 375/E7.265 |
| 6,658,159 | B1 | 12/2003 | Taubman | |
| 7,593,474 | B2 | 9/2009 | Jeong et al. | |
| 9,794,567 | B2 | 10/2017 | Kondo | |
| 2002/0039387 | A1* | 4/2002 | Auvray | H04N 11/044 |
| | | | | 375/240.18 |
| 2002/0061140 | A1* | 5/2002 | Kajiwara | H04N 19/70 |
| | | | | 382/233 |
| 2003/0128753 | A1 | 7/2003 | Lee | |
| 2003/0156648 | A1* | 8/2003 | Holcomb | H04N 19/136 |
| | | | | 375/240.18 |
| 2003/0169928 | A1 | 9/2003 | Stanek | |
| 2004/0028143 | A1* | 2/2004 | Schoenblum | H04N 19/147 |
| | | | | 375/240.25 |
| 2004/0114683 | A1* | 6/2004 | Schwarz | H03M 7/4006 |
| | | | | 375/240.2 |
| 2004/0136457 | A1* | 7/2004 | Funnell | H04N 19/40 |
| | | | | 375/240.01 |
| 2004/0233992 | A1* | 11/2004 | Base | H03M 7/4006 |
| | | | | 375/240.18 |
| 2005/0008231 | A1 | 1/2005 | Christopoulos | |
| 2005/0074176 | A1 | 4/2005 | Marpe | |
| 2005/0074177 | A1 | 4/2005 | Ichimura et al. | |
| 2005/0193485 | A1* | 9/2005 | Wolfe | G08B 21/082 |
| | | | | 4/504 |
| 2005/0226513 | A1 | 10/2005 | Wallace | |
| 2005/0286759 | A1* | 12/2005 | Zitnick, III | G06T 15/205 |
| | | | | 382/154 |
| 2006/0008009 | A1* | 1/2006 | Bao | H04N 19/176 |
| | | | | 375/240.24 |
| 2006/0098884 | A1 | 5/2006 | Kim | |
| 2006/0153294 | A1* | 7/2006 | Wang | H04N 19/197 |
| | | | | 375/240.08 |
| 2007/0183491 | A1* | 8/2007 | Pearson | H03M 7/4006 |
| | | | | 375/240 |
| 2008/0013624 | A1 | 1/2008 | Han | |
| 2008/0089424 | A1 | 4/2008 | Karczewicz | |
| 2008/0118143 | A1 | 5/2008 | Gordon | |
| 2008/0228476 | A1* | 9/2008 | Mehrotra | G10L 19/032 |
| | | | | 704/230 |
| 2008/0232706 | A1 | 9/2008 | Lee | |
| 2008/0238195 | A1 | 10/2008 | Argil | |
| 2008/0266151 | A1* | 10/2008 | Sankaran | H03M 7/4006 |
| | | | | 341/107 |
| 2008/0279449 | A1 | 11/2008 | Ramstad | |
| 2008/0292197 | A1* | 11/2008 | Nakagawa | H04N 19/105 |
| | | | | 382/238 |
| 2008/0310504 | A1 | 12/2008 | Ye | |
| 2008/0310512 | A1* | 12/2008 | Ye | H04N 19/197 |
| | | | | 375/240.16 |
| 2009/0072770 | A1 | 3/2009 | Son | |
| 2009/0086815 | A1* | 4/2009 | Tian | H04N 19/176 |
| | | | | 375/240.03 |
| 2009/0097568 | A1 | 4/2009 | Karczewicz | |
| 2009/0123066 | A1* | 5/2009 | Moriya | H04N 19/139 |
| | | | | 382/166 |
| 2009/0154820 | A1* | 6/2009 | Li | H04N 19/91 |
| | | | | 382/246 |
| 2009/0175331 | A1 | 7/2009 | Karczewicz | |
| 2009/0175332 | A1* | 7/2009 | Karczewicz | H04N 19/176 |
| | | | | 375/240.03 |
| 2009/0201995 | A1* | 8/2009 | Schwarz | H03M 7/4006 |
| | | | | 375/240.18 |
| 2009/0201996 | A1* | 8/2009 | Schwarz | H03M 7/4006 |
| | | | | 375/240.18 |
| 2009/0273706 | A1 | 11/2009 | Tu | |
| 2009/0296807 | A1 | 12/2009 | Cloutman | |
| 2009/0315328 | A1 | 12/2009 | Ajith | |
| 2010/0039569 | A1* | 2/2010 | Jeong | H04H 20/95 |
| | | | | 348/726 |
| 2010/0046626 | A1* | 2/2010 | Tu | H04N 19/176 |
| | | | | 375/240.18 |
| 2010/0232722 | A1 | 9/2010 | Park | |
| 2011/0103480 | A1* | 5/2011 | Dane | H04N 19/513 |
| | | | | 375/240.16 |
| 2011/0206135 | A1 | 8/2011 | Drugeon | |
| 2012/0230420 | A1* | 9/2012 | Sole Rojals | H04N 19/00109 |
| | | | | 375/240.18 |
| 2013/0188698 | A1* | 7/2013 | Chien | H04N 19/00781 |
| | | | | 375/240.12 |
| 2018/0098089 | A1* | 4/2018 | Chen | H04N 19/521 |

FOREIGN PATENT DOCUMENTS

| | | |
|---|---|---|
| EP | 1487113 A2 | 12/2004 |
| EP | 1768415 A1 | 3/2007 |
| EP | 1826897 A2 | 8/2007 |
| GB | 2264605 A | 1/1993 |
| JP | 2005-530375 A | 10/2005 |
| JP | 2007-215250 A | 8/2007 |
| JP | 2008-141382 A | 6/2008 |
| JP | 2008-263774 A | 10/2008 |
| JP | 2009-165144 A | 7/2009 |
| JP | 2012-532487 A | 12/2010 |
| KR | 2003-0060172 A | 7/2003 |
| KR | 1020050022850 A | 3/2005 |
| KR | 10-0936208 B1 | 1/2010 |
| TW | I323133 B | 4/2010 |
| WO | 03/094529 A2 | 11/2003 |

(56) References Cited

FOREIGN PATENT DOCUMENTS

| WO | 2007/034544 | A1 | 3/2007 |
| WO | 2009/049260 | A2 | 4/2009 |
| WO | 2009151232 | A2 | 12/2009 |
| WO | 2010/018138 | A1 | 2/2010 |
| WO | 2010/050156 | A1 | 6/2010 |
| WO | 2011/002491 | A1 | 1/2011 |
| WO | 2011/002492 | A1 | 1/2011 |

OTHER PUBLICATIONS

Bell et al., Proceedings of the Data Compression Conference, "Compression of Sparse Matrice by Arithmetic Coding", Department of Computer Science, Mar. 30, 1998, IEEE, Los Alamitos, CA, pp. 23-32, 10 pages.

Brady et al., Proceedings of the IEEE International Conference on Image Processing, "Context-based Arithmetic Encoding of 20 SIlape Sequences", vol. 1, Oct. 26, 1997, iEEE, Los Alamitos, CA, pp. 29-32; 8 pages.

English Translation of Official Communication issued in corresponding Korean Patent Application No. 10-2012-7028824, dated Feb. 9, 2015, 2 pages.

English translation of Official Communication issued in corresponding Japanese Patent Application No. 2013-504229, dated Oct. 15, 2013.

Marpe et al., Proceedings of the IEEE International Conference on Image Processing, "Context-based Adaptive Binary Arithmetic Coding in JVT/H.26L", Image Processing Department, vol. 2, Sep. 22, 2002, IEEE, Los Alamitos, CA, pp. 513-516.

Notice of Allowance dated Mar. 16, 2016, issued in parallel U.S. Appl. No. 14/944,012, 2 pages.

Notice of Allowance dated Mar. 1, 2016, in parallel Japanese Patent Application No. 2014-005353, English translation, 6 pages.

Office Action dated Sep. 29, 2016 in U.S. Appl. No. 15/200,300.

Office Action dated Jul. 25, 2016 issued in parallel Taiwanese Patent Application No. 104120305, with English translation, 9 pages.

Office Action dated Mar. 1, 2016, issued in parallel Japanese Patent Application No. 201355664 7, partial English translation, 3 pages.

Office Action dated Nov. 10, 2015, in parallel Japanese Patent Application No. 2014-005353, partial English translation, 3 pages.

Office Action dated Oct. 17, 2016 in U.S. Appl. No. 13/648,538.

Office Communication issued in corresponding Japanese Patent Application No. 2013-504229, dated Oct. 15, 2013 with English translation, 3 pages.

Official Communication issued in corresponding International Application PCT/EP2011/055644, dated Dec. 5, 2011, 7 pages.

Pennebaker et al., IBM Journal of Research and Development, "An overview of tile basic principles of the Q-Coder adaptive binary arithmetic coder", Nov. 1988, vol. 32, No. 6, New York, pp. 717-726; 10 pages.

Salomon et al., "Data Compression: The Complete Reference (passage)", XP-002270343, 1998, New York, pp. 69-84, 16 pages.

Winken, Martin, et al., "Description of video coding technology proposal by Fraunhofer HHI", Joint Collaborative Team on Video Coding (JCT-VC) of ITU-T SG16 WP3 and ISO/IEC JTC1/SC29/WG11, Document: JCTVC-A 116, Apr. 2010, 18 pages.

Zhang et aL, Proceedings of tile 2007 IEEE International Symposium on Circuits and Systems, "Context-based Arithmetic Coding Reexamined for OCT Video Compression", Chinese Academy of Sciences, May 1, 2007, IEEE, D Piscataway, NJ, pp. 3147-3150,4 pages.

Office Action dated Nov. 2, 2016 in U.S. Appl. No. 15/195,504.

Office Action dated Apr. 20, 2017 in U.S. Appl. 15/200,300.

Office Action dated May 18, 2017 in U.S. Appl. No. 13/648,538.

Office Action dated Nov. 30, 2017 in Taiwanese Application 106110819.

Office Action dated Dec. 4, 2017 in Chinese Application 2015104834238.

Notice of Allowance dated Feb. 7, 2018 in U.S. Appl. No. 15/200,300.

Non-Final Office Action U.S. Appl. No. 15/972,372 dated Jul. 30, 2018.

Notice of Allowance U.S. Appl. No. 15/940,584 dated Jul. 6, 2018.

Non-final Office Action U.S. Appl. No. 16/003,183 dated Sep. 18, 2018.

Notice of Allowance U.S. Appl. No. 15/940,733 dated Jul. 20, 2018.

Decision to Grant a Patent issued in Korean Patent Application No. 10-2017-7013586 dated Jul. 26, 2018 with English translation.

* cited by examiner

CODING OF SIGNIFICANCE MAPS AND TRANSFORM COEFFICIENT BLOCKS

CROSS-REFERENCE TO RELATED APPLICATIONS

This application is a continuation of U.S. patent application Ser. No. 15/200,300 filed Jul. 1, 2016, which is a continuation Ser. No. 13/648,538 filed Oct. 10, 2012, which is a continuation of International Application No. PCT/EP2011/055644, filed Apr. 11, 2011, and additionally claims priority from European Patent Application No. EP 10159766.4, filed Apr. 13, 2010 and International Patent Application No. PCT/EP2010/054822, filed Apr. 13, 2010, all of which are incorporated herein by reference in their entirety.

BACKGROUND OF THE INVENTION

The present application is directed to coding of significance maps indicating positions of significant transform coefficients within transform coefficient blocks and the coding of such transform coefficient blocks. Such coding may, for example, be used in picture and video coding, for example.

In conventional video coding, the pictures of a video sequence are usually decomposed into blocks. The blocks or the color components of the blocks are predicted by either motion-compensated prediction or intra prediction. The blocks can have different sizes and can be either quadratic or rectangular. All samples of a block or a color component of a block are predicted using the same set of prediction parameters, such as reference indices (identifying a reference picture in the already coded set of pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of 6 components. It is also possible that more than one set of prediction parameters (such as reference indices and motion parameters) are associated with a single block. In that case, for each set of prediction parameters, a single intermediate prediction signal for the block or the color component of a block is generated, and the final prediction signal is build by a weighted sum of the intermediate prediction signals. The weighting parameters and potentially also a constant offset (which is added to the weighted sum) can either be fixed for a picture, or a reference picture, or a set of reference pictures, or they can be included in the set of prediction parameters for the corresponding block. Similarly, still images are also often decomposed into blocks, and the blocks are predicted by an intra prediction method (which can be a spatial intra prediction method or a simple intra prediction method that predicts the DC component of the block). In a corner case, the prediction signal can also be zero.

The difference between the original blocks or the color components of the original blocks and the corresponding prediction signals, also referred to as the residual signal, is usually transformed and quantized. A two-dimensional transform is applied to the residual signal and the resulting transform coefficients are quantized. For this transform coding, the blocks or the color components of the blocks, for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks in a still image or a picture of a video sequence can have different sizes and the transform blocks can represent quadratic or rectangular blocks.

The resulting quantized transform coefficients, also referred to as transform coefficient levels, are then transmitted using entropy coding techniques. Therefore, a block of transform coefficients levels is usually mapped onto a vector (i.e., an ordered set) of transform coefficient values using a scan, where different scans can be used for different blocks. Often a zig-zag scan is used. For blocks that contain only samples of one field of an interlaced frame (these blocks can be blocks in coded fields or field blocks in coded frames), it is also common to use a different scan specifically designed for field blocks. A commonly used entropy coding algorithm for encoding the resulting ordered sequence of transform coefficients is run-level coding. Usually, a large number of the transform coefficient levels is zero, and a set of successive transform coefficient levels that are equal to zero can be efficiently represented by coding the number of successive transform coefficient levels that are equal to zero (the run). For the remaining (non-zero) transform coefficients, the actual level is coded. There are various alternatives of run-level codes. The run before a non-zero coefficient and the level of the non-zero transform coefficient can be coded together using a single symbol or code word. Often, special symbols for the end-of-block, which is sent after the last non-zero transform coefficient, are included. Or it is possible to first encode the number of non-zero transform coefficient levels, and depending on this number, the levels and runs are coded.

A somewhat different approach is used in the highly efficient CABAC entropy coding in H.264. Here, the coding of transform coefficient levels is split into three steps. In the first step, a binary syntax element coded_block_flag is transmitted for each transform block, which signals whether the transform block contains significant transform coefficient levels (i.e., transform coefficients that are non-zero). If this syntax element indicates that significant transform coefficient levels are present, a binary-valued significance map is coded, which specifies which of the transform coefficient levels have non-zero values. And then, in a reverse scan order, the values of the non-zero transform coefficient levels are coded. The significance map is coded as follows. For each coefficient in the scan order, a binary syntax element significant_coeff_flag is coded, which specifies whether the corresponding transform coefficient level is not equal to zero. If the significant_coeff_flag bin is equal to one, i.e., if a non-zero transform coefficient level exists at this scanning position, a further binary syntax element last_significant_coeff_flag is coded. This bin indicates if the current significant transform coefficient level is the last significant transform coefficient level inside the block or if further significant transform coefficient levels follow in scanning order. If last_significant_coeff_flag indicates that no further significant transform coefficients follow, no further syntax elements are coded for specifying the significance map for the block. In the next step, the values of the significant transform coefficient levels are coded, whose locations inside the block are already determined by the significance map. The values of significant transform coefficient levels are coded in reverse scanning order by using the following three syntax elements. The binary syntax element coeff_abs_greater_one indicates if the absolute value of the significant transform coefficient level is greater than one. If the binary syntax element coeff_abs_greater_one indicates that the absolute value is greater than one, a further syntax element coeff_abs_level_minus_one is sent, which specifies the absolute value of the transform coefficient level minus one. Finally, the binary syntax element coeff_sign_flag, which specifies the sign of the transform coefficient value, is coded for each significant transform coefficient level. It should be noted again that the syntax elements that are related to the significance map are coded in scanning order, whereas the syntax elements that are related to the actual values of the transform coefficients levels are coded in reverse scanning order allowing the usage of more suitable context models.

In the CABAC entropy coding in H.264, all syntax elements for the transform coefficient levels are coded using a binary probability modelling. The non-binary syntax element coeff_abs_level_minus_one is first binarized, i.e., it is mapped onto a sequence of binary decisions (bins), and these bins are sequentially coded. The binary syntax elements significant_coeff_flag, last significant_coeff_flag, coeff_abs_greater_one, and coeff_sign_flag are directly coded. Each coded bin (including the binary syntax elements) is associated with a context. A context represents a probability model for a class of coded bins. A measure related to the probability for one of the two possible bin values is estimated for each context based on the values of the bins that have been already coded with the corresponding context. For several bins related to the transform coding, the context that is used for coding is selected based on already transmitted syntax elements or based on the position inside a block.

The significance map specifies information about the significance (transform coefficient level is different from zero) for the scan positions. In the CABAC entropy coding of H.264, for a block size of 4×4, a separate context is used for each scan position for coding the binary syntax elements significant_coeff_flag and the last significant_coeff_flag, where different contexts are used for the significant_coeff_flag and the last significant_coeff_flag of a scan position. For 8×8 blocks, the same context model is used for four successive scan positions, resulting in 16 context models for the significant_coeff_flag and additional 16 context models for the last significant_coeff_flag.

This method of context modelling for the significant_coeff_flag and the last significant_coeff_flag has some disadvantages for large block sizes. On the one hand side, if each scan position is associated with a separate context model, the number of context models does significantly increase when blocks greater than 8×8 are coded. Such an increased number of context models results in a slow adaptation of the probability estimates and usually an inaccuracy of the probability estimates, where both aspects have a negative impact on the coding efficiency. On the other hand, the assignment of a context model to a number of successive scan positions (as done for 8×8 blocks in H.264) is also not optimal for larger block sizes, since the non-zero transform coefficients are usually concentrated in particular regions of a transform block (the regions are dependent on the main structures inside the corresponding blocks of the residual signal).

After coding the significance map, the block is processed in reverse scan order. If a scan position is significant, i.e., the coefficient is different from zero, the binary syntax element coeff_abs_greater_one is transmitted. Initially, the second context model of the corresponding context model set is selected for the coeff_abs_greater_one syntax element. If the coded value of any coeff_abs_greater_one syntax element inside the block is equal to one (i.e., the absolute coefficient is greater than 2), the context modelling switches back to the first context model of the set and uses this context model up to the end of the block. Otherwise (all coded values of coeff_abs_greater_one inside the block are zero and the corresponding absolute coefficient levels are equal to one), the context model is chosen depending on the number of the coeff_abs_greater_one syntax elements equal to zero that have already been coded/decoded in the reverse scan of the considered block. The context model selection for the syntax element coeff_abs_greater_one can be summarized by the following equation, where the current context model index $C_t+1$ is selected based on the previous context model index $C_t$ and the value of the previously coded syntax element coeff_abs_greater_one, which is represented by $bin_t$ in the equation. For the first syntax element coeff_abs_greater_one inside a block, the context model index is set equal to $C_t=1$.

$$C_{t+1}(C_t, bin_t) = \begin{cases} 0, & \text{for } bin_t = 1 \\ \min(C_t + 1, 4) & \text{for } bin_t = 0 \end{cases}$$

The second syntax element for coding the absolute transform coefficient levels, coeff_abs_level_minus_one is only coded, when the coeff_abs_greater_one syntax element for the same scan position is equal to one. The non-binary syntax element coeff_abs_level_minus_one is binarized into a sequence of bins and for the first bin of this binarization; a context model index is selected as described in the following. The remaining bins of the binarization are coded with fixed contexts. The context for the first bin of the binarization is selected as follows. For the first coeff_abs_level_minus_one syntax element, the first context model of the set of context models for the first bin of the coeff_abs_level_minus_one syntax element is selected, the corresponding context model index is set equal to $C_t=0$. For each further first bin of the coeff_abs_level_minus_one syntax element, the context modelling switches to the next context model in the set, where the number of context models in set is limited to 5. The context model selection can be expressed by the following formula, where the current context model index $C_{t+1}$ is selected based on the previous context model index $C_t$. As mentioned above, for the first syntax element coeff_abs_level_minus_one inside a block, the context model index is set equal to $C_t=0$. Note, that different sets of context models are used for the syntax elements coeff_abs_greater_one and coeff_abs_level_minus_one.

$$C_{t+1}(C_t) = \min(C_t+1, 4)$$

For large blocks, this method has some disadvantages. The selection of the first context model for coeff_abs_greater_one (which is used if a value of coeff_abs_greater_one equal to 1 has been coded for the blocks) is usually done too early and the last context model for coeff_abs_level_minus_one is reached too fast because the number of significant coefficients is larger than in small blocks. So, most bins of coeff_abs_greater_one and coeff_abs_level_minus_one are coded with a single context model. But these bins usually have different probabilities, and hence the usage of a single context model for a large number of bins has a negative impact on the coding efficiency.

Although, in general, large blocks increase the computational overhead for performing the spectral decomposing transform, the ability to effectively code both small and large blocks would enable the achievement of better coding efficiency in coding sample arrays such as pictures or sample arrays representing other spatially sampled information signals such as depth maps or the like. The reason for this is the dependency between spatial and spectral resolution when transforming a sample array within blocks: the larger the blocks the higher the spectral resolution of the transform is. Generally, it would be favorable to be able to locally apply the individual transform on a sample array such that within the area of such an individual transform, the spectral composition of the sample array does not vary to a great extent. To small blocks guarantee that the content within the blocks is relatively consistent. On the other hand, if the blocks are too small, the spectral resolution is low, and the ratio between non-significant and significant transform coefficients gets lower.

Thus, it would be favorable to have a coding scheme which enables an efficient coding for transform coefficient blocks, even when they are large, and their significance maps.

SUMMARY

According to an embodiment, an apparatus for decoding a significance map indicating positions of significant transform coefficients within a transform coefficient block from a data stream may have a decoder configured to sequentially extract first-type syntax elements from the data stream, the first-type syntax elements indicating, for associated positions within the transform coefficient block, at least, as to whether at the respective position a significant or insignificant transform coefficient is situated; and an associator configured to sequentially associate the sequentially extracted first-type syntax elements to the positions of the transform coefficient block in a scan order among the positions of the transform coefficient block, which depends on the positions of the significant transform coefficients indicated by previously extracted and associated first-type syntax elements.

According to another embodiment, an apparatus for decoding a significance map indicating positions of significant transform coefficients within a transform coefficient block from a data stream may have an decoder configured to extract a significance map indicating positions of significant transform coefficients within the transform coefficient block, and then the values of the significant transform coefficients within the transform coefficient block from a data stream, with, in extracting the significance map, sequentially extracting first-type syntax elements from the data stream by context-adaptive entropy decoding, the first-type syntax elements indicating, for associated positions within the transform coefficient block as to whether at the respective position a significant or insignificant transform coefficient is situated; and an associator configured to sequentially associate the sequentially extracted first-type syntax elements to the positions of the transform coefficient block in a predetermined scan order among the positions of the transform coefficient block, wherein the decoder is configured to use, in context-adaptively entropy decoding the first-type syntax elements, contexts which are individually selected for each of the first-type syntax elements depending on a number of positions at which according to the previously extracted and associated first-type syntax elements significant transform coefficients are situated, in a neighborhood of the position with which a current first-type syntax element is associated.

According to another embodiment, an apparatus for decoding a transform coefficient block may have a decoder configured to extract a significance map indicating positions of significant transform coefficients within the transform coefficient block, and then the values of the significant transform coefficients within the transform coefficient block from a data stream, with, in extracting the values of the significant transform coefficients, sequentially extracting the values by context-adaptive entropy decoding; and an associator configured to sequentially associate the sequentially extracted values with the positions of the significant transform coefficients in a predetermined coefficient scan order among the positions of the transform coefficient block, according to which the transform coefficient block is scanned in sub-blocks of the transform coefficient block using a sub-block scan order with, subsidiary, scanning the positions of the transform coefficients within the sub-blocks in a position sub-scan order, wherein the decoder is configured to use, in sequentially context-adapted entropy decoding the values of the significant transform coefficient values, a selected set of a number of contexts from a plurality of sets of a number of contexts, the selection of the selected set being performed for each sub-block depending on the values of the transform coefficients within a sub-block of the transform coefficient block, already having been traversed in the sub-block scan order, or the values of the transform coefficients of a co-located sub-block in an equally sized previously decoded transform coefficient block.

According to another embodiment, a transform-based decoder configured to decode a transform coefficient block using an apparatus decoding a significance map indicating positions of significant transform coefficients within a transform coefficient block from a data stream may have an decoder configured to sequentially extract first-type syntax elements from the data stream, the first-type syntax elements indicating, for associated positions within the transform coefficient block, at least, as to whether at the respective position a significant or insignificant transform coefficient is situated; and an associator configured to sequentially associate the sequentially extracted first-type syntax elements to the positions of the transform coefficient block in a scan order among the positions of the transform coefficient block, which depends on the positions of the significant transform coefficients indicated by previously extracted and associated first-type syntax elements, and to perform a transform from spectral domain to spatial domain to the transform coefficient block.

According to another embodiment, a transform-based decoder configured to decode a transform coefficient block using an apparatus for decoding a significance map indicating positions of significant transform coefficients within a transform coefficient block from a data stream may have an decoder configured to extract a significance map indicating positions of significant transform coefficients within the transform coefficient block, and then the values of the significant transform coefficients within the transform coefficient block from a data stream, with, in extracting the significance map, sequentially extracting first-type syntax elements from the data stream by context-adaptive entropy decoding, the first-type syntax elements indicating, for associated positions within the transform coefficient block as to whether at the respective position a significant or insignificant transform coefficient is situated; and an associator configured to sequentially associate the sequentially extracted first-type syntax elements to the positions of the transform coefficient block in a predetermined scan order among the positions of the transform coefficient block, wherein the decoder is configured to use, in context-adaptively entropy decoding the first-type syntax elements, con- texts which are individually selected for each of the first-type syntax elements depending on a number of positions at which according to the previously extracted and associated first-type syntax elements significant transform coefficients are situated, in a neighborhood of the position with which a current first-type syntax element is associated, and to perform a transform from spectral domain to spatial domain to the transform coefficient block.

According to another embodiment, a predictive decoder may have a transform-based decoder configured to decode a transform coefficient block using an apparatus for decoding a significance map indicating positions of significant transform coefficients within a transform coefficient block from a data stream, wherein the apparatus may have an decoder configured to sequentially extract first-type syntax elements from the data stream, the first-type syntax elements indicating, for associated positions within the transform coefficient block, at least, as to whether at the respective position a significant or insignificant transform coefficient is situated; and an associator configured to sequentially associate the sequentially extracted first-type syntax elements to the positions of the transform coefficient block in a scan order among the positions of the transform coefficient block, which depends on the positions of the significant transform coefficients indicated by previously extracted and associated first-type syntax elements, and to perform a transform from spectral domain to spatial domain to the transform coefficient block to obtain a residual block; a predictor configured to provide a prediction for a block of an array of information samples representing an spatially sampled information signal; and a combiner configured to combine the prediction of the block and the residual block to reconstruct the array of information samples.

According to another embodiment, a predictive decoder may have a transform-based decoder configured to decode a transform coefficient block using an apparatus for decoding a significance map indicating positions of significant transform coefficients within a transform coefficient block from a data stream which may have an decoder configured to extract a significance map indicating positions of significant transform coefficients within the transform coefficient block, and then the values of the significant transform coefficients within the transform coefficient block from a data stream, with, in extracting the significance map, sequentially extracting first-type syntax elements from the data stream by context-adaptive entropy decoding, the first-type syntax elements indicating, for associated positions within the transform coefficient block as to whether at the respective position a significant or insignificant transform coefficient is situated; and an associator configured to sequentially associate the sequentially extracted first-type syntax elements to the positions of the transform coefficient block in a predetermined scan order among the positions of the transform coefficient block, wherein the decoder is configured to use, in context-adaptively entropy decoding the first-type syntax elements, contexts which are individually selected for each of the first-type syntax elements depending on a number of positions at which according to the previously extracted and associated first-type syntax elements significant transform coefficients are situated, in a neighborhood of the position with which a current first-type syntax element is associated, and to perform a transform from spectral domain to spatial domain to the transform coefficient block to obtain a residual block; a predictor configured to provide a prediction for a block of an array of information samples representing an spatially sampled information signal; and a combiner configured to combine the prediction of the block and the residual block to reconstruct the array of information samples.

Another embodiment may have an apparatus for encoding a significance map indicating positions of significant transform coefficients within a transform coefficient block into a data stream, the apparatus being configured to sequentially code first-type syntax elements into the data stream by entropy encoding, the first-type syntax elements indicating, for associated positions within the transform coefficient block, at least, as to whether at the respective position a significant or insignificant transform coefficient is situated, wherein the apparatus is further configured to the first-type syntax elements into the data stream at a scan order among the positions of the transform coefficient block, which depends on the positions of the significant transform coefficients indicated by previously coded first-type syntax elements.

Another embodiment may have an apparatus for encoding a significance map indicating positions of significant transform coefficients within a transform coefficient block into a data stream, the apparatus being configured to code a significance map indicating positions of significant transform coefficients within the transform coefficient block, and then the values of the significant transform coefficients within the transform coefficient block into the data stream, with, in coding the significance map, sequentially coding first-type syntax elements into the data stream by context-adaptive entropy encoding, the first-type syntax elements indicating, for associated positions within the transform coefficient block as to whether at the respective position a significant or insignificant transform coefficient is situated, wherein the apparatus is further configured to sequentially code the first-type syntax elements into the data stream in a predetermined scan order among the positions of the transform coefficient block, wherein the apparatus is configured to use, in context-adaptively entropy encoding each of the first-type syntax elements, contexts which are individually selected for the first-type syntax elements depending on a number of positions at which significant transform coefficients are situated and with which the previously coded first-type syntax elements are associated, in a neighborhood of the position with which a current first-type syntax element is associated.

Another embodiment may have an apparatus for encoding a transform coefficient block, configured to code a significance map indicating positions of significant transform coefficients within the transform coefficient block, and then the values of the significant transform coefficients within the transform coefficient block into a data stream, with, in extracting the values of the significant transform coefficients, sequentially coding the values by context-adaptive entropy encoding, wherein the apparatus is configured to code the values into the data stream in a predetermined coefficient scan order among the positions of the transform coefficient block, according to which the transform coefficient block is scanned in sub-blocks of the transform coefficient block using a sub-block scan order with, subsidiary, scanning the positions of the transform coefficients within the sub-blocks in a position sub-scan order, wherein the apparatus is further configured to use, in sequentially context-adapted entropy encoding the values of the significant transform coefficient values, a selected set of a number of contexts from a plurality of sets of a number of contexts, the selection of the selected set being performed for each sub-block depending on the values of the transform coefficients within a sub-block of the transform coefficient block, already having been traversed in the sub-block scan order, or the values of the transform coefficients of a co-located sub-block in an equally sized previously encoded transform coefficient block.

According to another embodiment, a method for decoding a significance map indicating positions of significant transform coefficients within a transform coefficient block from a data stream may have the steps of sequentially extracting first-type syntax elements from the data stream, the first-type syntax elements indicating, for associated positions within the transform coefficient block, at least, as to whether at the respective position a significant or insignificant transform coefficient is situated; and sequentially associating the sequentially extracted first-type syntax elements to the positions of the transform coefficient block in a scan order among the positions of the transform coefficient block, which depends on the positions of the significant transform coefficients indicated by previously extracted and associated first-type syntax elements.

According to another embodiment, a method for decoding a significance map indicating positions of significant transform coefficients within a transform coefficient block from a data stream may have the steps of extracting a significance map indicating positions of significant transform coefficients within the transform coefficient block, and then the values of the significant transform coefficients within the transform coefficient block from a data stream, with, in extracting the significance map, sequentially extracting first-type syntax elements from the data stream by context-adaptive entropy decoding, the first-type syntax elements indicating, for associated positions within the transform coefficient block as to whether at the respective position a significant or insignificant transform coefficient is situated; and sequentially associating the sequentially extracted first-type syntax elements to the positions of the transform coefficient block in a predetermined scan order among the positions of the transform coefficient block, wherein, in context-adaptively entropy decoding the first-type syntax elements, contexts are used which are individually selected for each of the first-type syntax elements depending on a number of positions at which according to the previously extracted and associated first-type syntax elements significant transform coefficients are situated, in a neighborhood of the position with which a current first-type syntax element is associated.

According to another embodiment, a method for decoding a transform coefficient block may have the steps of extracting a significance map indicating positions of significant transform coefficients within the transform coefficient block, and then the values of the significant transform coefficients within the transform coefficient block from a data stream, with, in extracting the values of the significant transform coefficients, sequentially extracting the values by context-adaptive entropy decoding; and sequentially associating the sequentially extracted values with the positions of the significant transform coefficients in a predetermined coefficient scan order among the positions of the transform coefficient block, according to which the transform coefficient block is scanned in sub-blocks of the transform coefficient block using a sub-block scan order with, subsidiary, scanning the positions of the transform coefficients within the sub-blocks in a position sub-scan order, wherein, in sequentially context-adapted entropy decoding the values of the significant transform coefficient values, a selected set of a number of contexts from a plurality of sets of a number of contexts is used, the selection of the selected set being performed for each sub-block depending on the values of the transform coefficients within a sub-block of the transform coefficient block, already having been traversed in the sub-block scan order, or the values of the transform coefficients of a co-located sub-block in an equally sized previously decoded transform coefficient block.

According to another embodiment, a method for encoding a significance map indicating positions of significant transform coefficients within a transform coefficient block into a data stream may have the steps of sequentially coding first-type syntax elements into the data stream by entropy encoding, the first-type syntax elements indicating, for associated positions within the transform coefficient block, at least, as to whether at the respective position a significant or insignificant transform coefficient is situated, with coding the first-type syntax elements into the data stream at a scan order among the positions of the transform coefficient block, which depends on the positions of the significant transform coefficients indicated by previously coded first-type syntax elements.

According to another embodiment, a method for encoding a significance map indicating positions of significant transform coefficients within a transform coefficient block into a data stream may have the steps of coding a significance map indicating positions of significant transform coefficients within the transform coefficient block, and then the values of the significant transform coefficients within the transform coefficient block into the data stream, with, in coding the significance map, sequentially coding first-type syntax elements into the data stream by context-adaptive entropy encoding, the first-type syntax elements indicating, for associated positions within the transform coefficient block as to whether at the respective position a significant or insignificant transform coefficient is situated, wherein the sequentially coding the first-type syntax elements into the data stream is performed in a predetermined scan order among the positions of the transform coefficient block, and in context-adaptively entropy encoding each of the first-type syntax elements, contexts are used which are individually selected for the first-type syntax elements depending on a number of positions at which significant transform coefficients are situated and with which the previously coded first-type syntax elements are associated, in a neighborhood of the position with which a current first-type syntax element is associated.

According to another embodiment, a method for encoding a transform coefficient block may have the steps of coding a significance map indicating positions of significant transform coefficients within the transform coefficient block, and then the values of the significant transform coefficients within the transform coefficient block into a data stream, with, in coding the values of the significant transform coefficients, sequentially coding the values by context-adaptive entropy encoding, wherein the coding the values into the data stream is performed in a predetermined coefficient scan order among the positions of the transform coefficient block, according to which the transform coefficient block is scanned in sub-blocks of the transform coefficient block using a sub-block scan order with, subsidiary, scanning the positions of the transform coefficients within the sub-blocks in a position sub-scan order, wherein in sequentially context-adapted entropy encoding the values of the significant transform coefficient values, a selected set of a number of contexts from a plurality of sets of a number of contexts is used, the selection of the selected set being performed for each sub-block depending on the values of the transform coefficients within a sub-block of the transform coefficient block, already having been traversed in the sub-block scan order, or the values of the transform coefficients of a co-located sub-block in an equally sized previously encoded transform coefficient block.

Another embodiment may be a data stream having encoded therein a significance map indicating positions of significant transform coefficients within a transform coefficient block, wherein first-type syntax elements are sequentially coded into the data stream by entropy encoding, the first-type syntax elements indicating, for associated positions within the transform coefficient block, at least, as to whether at the respective position a significant or insignificant transform coefficient is situated, wherein the first-type syntax elements are coded into the data stream at a scan order among the positions of the transform coefficient block, which depends on the positions of the significant transform coefficients indicated by previously coded first-type syntax elements.

Another embodiment may be a data stream having encoded therein significance map indicating positions of significant transform coefficients within a transform coefficient block, wherein a significance map indicating positions of significant transform coefficients within the transform coefficient block, followed by the values of the significant transform coefficients within the transform coefficient block are coded into the data stream, wherein, within the significance map, the first-type syntax elements are sequentially codes into the data stream by context-adaptive entropy encoding, the first-type syntax elements indicating, for associated positions within the transform coefficient block as to whether at the respective position a significant or insignificant transform coefficient is situated, wherein the first-type syntax elements are sequentially coding into the data stream in a predetermined scan order among the positions of the transform coefficient block, and the first-type syntax elements are context-adaptively entropy encoded into the data stream using contexts which are individually selected for the first-type syntax elements depending on a number of positions at which significant transform coefficients are situated and with which the preceding first-type syntax elements coded into the data stream are associated, in a neighborhood of the position with which a current first-type syntax element is associated.

Another embodiment may be a data stream having encoded a coding of a significance map indicating positions of significant transform coefficients within the transform coefficient block, followed by the values of the significant transform coefficients within the transform coefficient block, wherein the values of the significant transform coefficients are sequentially coded into the data stream by context-adaptive entropy encoding in a predetermined coefficient scan order among the positions of the transform coefficient block, according to which the transform coefficient block is scanned in sub-blocks of the transform coefficient block using a sub-block scan order with, subsidiary, scanning the positions of the transform coefficients within the sub-blocks in a position sub-scan order, wherein the values of the significant transform coefficient values are sequentially context-adapted entropy encoded into the data stream using a selected set of a number of contexts from a plurality of sets of a number of contexts, the selection of the selected set being performed for each sub-block depending on the values of the transform coefficients within a sub-block of the transform coefficient block, already having been traversed in the sub-block scan order, or the values of the transform coefficients of a co-located sub-block in an equally sized previously encoded transform coefficient block.

Another embodiment may be a computer readable digital storage medium having stored thereon a computer program having a program code for performing, when running on a computer, a method for decoding a significance map indicating positions of significant transform coefficients within a transform coefficient block from a data stream having the steps of extracting a significance map indicating positions of significant transform coefficients within the transform coefficient block, and then the values of the significant transform coefficients within the transform coefficient block from a data stream, with, in extracting the significance map, sequentially extracting first-type syntax elements from the data stream by context-adaptive entropy decoding, the first-type syntax elements indicating, for associated positions within the transform coefficient block as to whether at the respective position a significant or insignificant transform coefficient is situated; and sequentially associating the sequentially extracted first-type syntax elements to the positions of the transform coefficient block in a predetermined scan order among the positions of the transform coefficient block, wherein, in context-adaptively entropy decoding the first-type syntax elements, contexts are used which are individually selected for each of the first-type syntax elements depending on a number of positions at which according to the previously extracted and associated first-type syntax elements significant transform coefficients are situated, in a neighborhood of the position with which a current first-type syntax element is associated.

Another embodiment may be a computer readable digital storage medium having stored thereon a computer program having a program code for performing, when running on a computer, a method for decoding a transform coefficient block, which may have the steps of extracting a significance map indicating positions of significant transform coefficients within the transform coefficient block, and then the values of the significant transform coefficients within the transform coefficient block from a data stream, with, in extracting the values of the significant transform coefficients, sequentially extracting the values by context-adaptive entropy decoding; and sequentially associating the sequentially extracted values with the positions of the significant transform coefficients in a predetermined coefficient scan order among the positions of the transform coefficient block, according to which the transform coefficient block is scanned in sub-blocks of the transform coefficient block using a sub-block scan order with, subsidiary, scanning the positions of the transform coefficients within the sub-blocks in a position sub-scan order, wherein, in sequentially context-adapted entropy decoding the values of the significant transform coefficient values, a selected set of a number of contexts from a plurality of sets of a number of contexts is used, the selection of the selected set being performed for each sub-block depending on the values of the transform coefficients within a sub-block of the transform coefficient block, already having been traversed in the sub-block scan order, or the values of the transform coefficients of a co-located sub-block in an equally sized previously decoded transform coefficient block.

Another embodiment may be a computer readable digital storage medium having stored thereon a computer program having a program code for performing, when running on a computer, a method for encoding a significance map indicating positions of significant transform coefficients within a transform coefficient block into a data stream, which may have the steps of sequentially coding first-type syntax elements into the data stream by entropy encoding, the first-type syntax elements indicating, for associated positions within the transform coefficient block, at least, as to whether at the respective position a significant or insignificant transform coefficient is situated, with coding the first-type syntax elements into the data stream at a scan order among the positions of the transform coefficient block, which depends on the positions of the significant transform coefficients indicated by previously coded first-type syntax elements.

In accordance with a first aspect of the present application, an underlying idea of the present application is that a higher coding efficiency for coding a significance map indicating positions of significant transform coefficients within a transform coefficient block may be achieved if the scan order by which the sequentially extracted syntax elements indicating, for associated positions within the transform coefficient block, as to whether at the respective position a significant or insignificant transform coefficient is situated, are sequentially associated to the positions of the transform coefficient block, among the positions of the transform coefficient block depends on the positions of the significant transform coefficients indicated by previously associated syntax elements. In particular, the inventors found out that in typical sample array content such as picture, video or depth map content, the significant transform coefficients mostly form clusters at a certain side of the transform coefficient block corresponding to either non-zero frequencies in the vertical and low frequencies in the horizontal direction or vice versa so that taking into account the positions of significant transform coefficients indicated by previously associated syntax elements enables to control the further cause of the scan such that the probability of reaching the last significant transform coefficient within the transform coefficient block earlier is increased relative to a procedure according to which the scan order is predetermined independent from the positions of the significant transform coefficients indicated by previously associated syntax elements so far. This is particularly true for larger blocks, although the just said is also true for small blocks.

In accordance with an embodiment of the present application, the entropy decoder is configured to extract from the data stream information enabling to recognize as to whether a significant transform coefficient currently indicated by a currently associated syntax element is the last significant transform coefficient independent from its exact position within the transform coefficient block wherein the entropy decoder is configured to expect no further syntax element in case of the current syntax element relating to such last significant transform coefficient. This information may comprise the number of significant transform coefficients within the block. Alternatively, second syntax elements are interleaved with the first syntax elements, the second syntax elements indicating, for associated positions at which a significant transform coefficient is situated, as to whether same is the last transform coefficient in the transform coefficient block or not.

In accordance with an embodiment, the associator adapts the scan order depending on the positions of the significant transform coefficients indicated so far merely at predefined positions within the transform coefficient block. For example, several sub-paths which traverse mutually disjointed sub-sets of positions within the transform coefficient block extend substantially diagonally from one pair of sides of the transform coefficient block corresponding to minimum frequency along a first direction and highest frequency along the other direction, respectively, to an opposite pair of sides of the transform coefficient block corresponding to zero frequency along the second direction and maximum frequency along the first direction, respectively. In this case the associator is configured to select the scan order such that the sub-paths are traversed in an order among the sub-paths where the distance of the sub-paths to the DC position within the transform coefficient block monotonically increases, each sub-path is traversed without interrupt along run direction, and for each sub-path the direction along which the sub-path is traversed is selected by the associator depending on the positions of the significant transform coefficients having been traversed during the previous sub-paths. By this measure, the probability is increased that the last sub-path, where the last significant transform coefficient is situated, is traversed in a direction so that it is more probable that the last significant transform coefficient lies within the first half of this last sub-path than within the second half thereof, thereby enabling to reduce the number of syntax elements indicating as to whether at a respective position a significant or insignificant transform coefficient is situated. The effect is especially valuable in case of large transform coefficient blocks.

According to a further aspect of the present application, the present application is based on the finding that a significance map indicating positions of significant transform coefficients within a transform coefficient block may be coded more efficiently if the aforementioned syntax elements indicating, for associated positions within the transform coefficient block as to whether at the respective position a significant or insignificant transform coefficient is situated, are context-adaptively entropy decoded using contexts which are individually selected for each of the syntax elements dependent on a number of significant transform coefficients in a neighborhood of the respective syntax element, indicated as being significant by any of the preceding syntax elements. In particular, the inventors found out that with increasing size of the transform coefficient blocks, the significant transform coefficients are somehow clustered at certain areas within the transform coefficient block so that a context adaptation which is not only sensitive to the number of significant transform coefficients having been traversed in the predetermined scan orders so far but also takes into account the neighborhood of the significant transform coefficients results in a better adaptation of the context and therefore increases the coding efficiency of the entropy coding. Of course, both of the above-outlined aspects may be combined in a favorable way.

Further, in accordance with an even further aspect of the present application, the application is based on the finding that the coding efficiency for coding a transform coefficient block may be increased when a significance map indicating positions of the significant transform coefficients within the transform coefficient block precedes the coding of the actual values of the significant transform coefficients within the transform coefficient block and if the predetermined scan order among the positions of the transform coefficient block used to sequentially associate the sequence of values of the significant transform coefficients with the positions of the significant transform coefficients scans the transform coefficient block in sub-blocks using a sub-block scan order among the sub-blocks with, subsidiary, scanning the positions of the transform coefficients within the sub-blocks in a coefficients scan order, and if a selected set of a number of contexts from a plurality of sets of a number of context is used for sequentially context adaptively entropy decoding the values of the significant transform coefficient values, the selection of the selected set depending on the values of the transform coefficients within a sub-block of the transform coefficient block already having been traversed in the sub-block scan order or the values of the transform coefficients of a co-located sub-block in a previously decoded transform coefficient block. This way the context adaptation is very well suited to the above-outlined property of significant transform coefficients being clustered at certain areas within a transform coefficient block, especially when large transform coefficient blocks are considered. In other words, the values may be scanned in sub-blocks, and contexts selected based on sub-block statistics.

Again, even the latter aspect may be combined with any of the previously identified aspects of the present application or with both aspects.

BRIEF DESCRIPTION OF THE DRAWINGS

Embodiments of the present application are described in the following with respect to the Figures among which

DETAILED DESCRIPTION OF THE INVENTION

It is noted that during the description of the figures, elements occurring in several of these Figures are indicated with the same reference sign in each of these Figures and a repeated description of these elements as far as the functionality is concerned is avoided in order to avoid unnecessary repetitions. Nevertheless, the functionalities and descriptions provided with respect to one figure shall also apply to other Figures unless the opposite is explicitly indicated.

Figure 1:
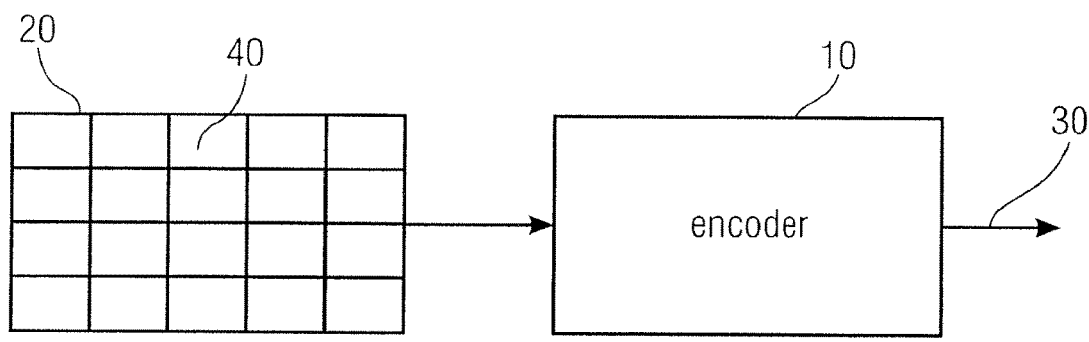
FIG. 1 shows a block diagram of an encoder according to an embodiment.

FIG. 1 shows an example for an encoder 10 in which aspects of the present application may be implemented. The encoder encodes an array of information samples 20 into a data stream. The array of information samples may represent any kind of spatially sampled information signal. For example, the sample array 20 may be a still picture or a picture of a video. Accordingly, the information samples may correspond to brightness values, color values, luma values, chroma values or the like. However, the information samples may also be depth values in case of the sample array 20 being a depth map generated by, for example, a time of light sensor or the like.

The encoder 10 is a block-based encoder. That is, encoder 10 encodes the sample array 20 into the data stream 30 in units of blocks 40. The encoding in units of blocks 40 does not necessarily mean that encoder 10 encodes these blocks 40 totally independent from each other. Rather, encoder 10 may use reconstructions of previously encoded blocks in order to extrapolate or intra-predict remaining blocks, and may use the granularity of the blocks for setting coding parameters, i.e. for setting the way each sample array region corresponding to a respective block is coded.

Further, encoder 10 is a transform coder. That its, encoder 10 encodes blocks 40 by using a transform in order to transfer the information samples within each block 40 from spatial domain into spectral domain. A two-dimensional transform such as a DCT of FFT or the like may be used. Advantageously, the blocks 40 are of quadratic shape or rectangular shape.

The sub-division of the sample array 20 into blocks 40 shown in FIG. 1 merely serves for illustration purposes. FIG. 1 shows the sample array 20 as being sub-divided into a regular two-dimensional arrangement of quadratic or rectangular blocks 40 which abut to each other in a non-overlapping manner. The size of the blocks 40 may be predetermined. That is, encoder 10 may not transfer an information on the block size of blocks 40 within the data stream 30 to the decoding side. For example, the decoder may expect the predetermined block size.

However, several alternatives are possible. For example, the blocks may overlap each other. The overlapping may, however, be restricted to such an extent that each block has a portion not overlapped by any neighbouring block, or such that each sample of the blocks is overlapped by, at the maximum, one block among the neighbouring blocks arranged in juxtaposition to the current block along a predetermined direction. That latter would mean that the left and right hand neighbor blocks may overlap the current block so as to fully cover the current block but they may not overlay each other, and the same applies for the neighbors in vertical and diagonal direction.

As a further alternative, the sub-division of sample array 20 into blocks 40 may be adapted to the content of the sample array 20 by the encoder 10 with the sub-division information on the sub-division used being transferred to the decoder side via bitstream 30.

Figure 2A:
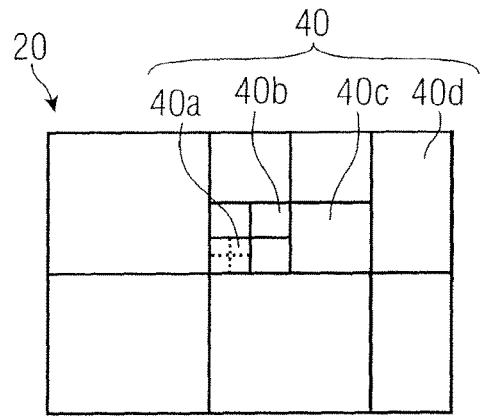
FIGS. 2a-2c schematically show different sub-divisions of a sample array such as a picture into blocks.
Figure 2B:
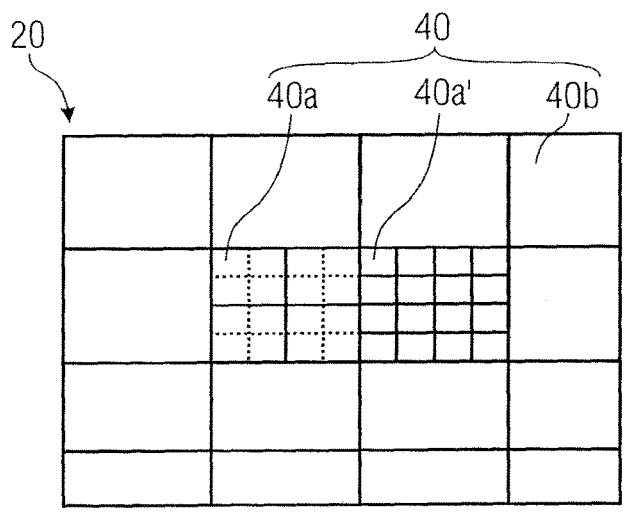
Figure 2C:
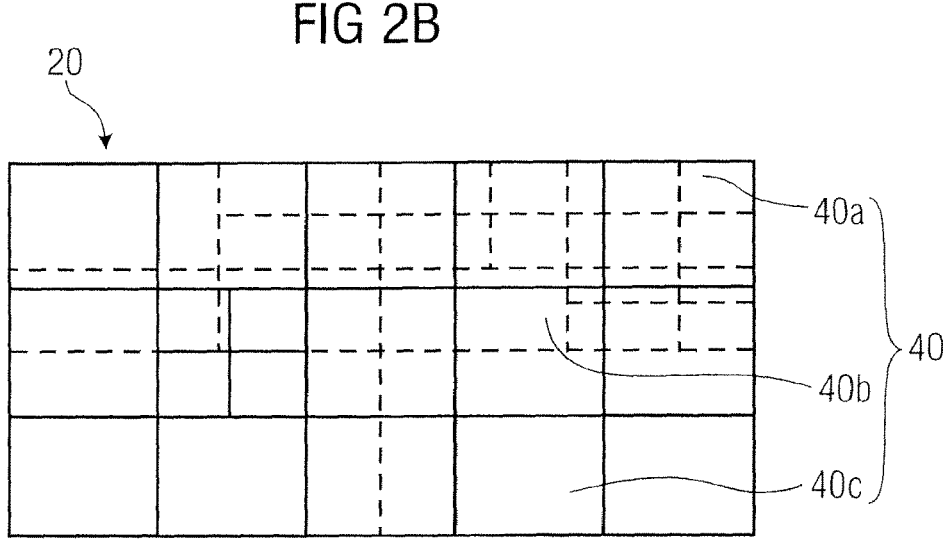

FIGS. 2a to 2c show different examples for a sub-division of a sample array 20 into blocks 40. FIG. 2a shows a quadtree-based sub-division of a sample array 20 into blocks 40 of different sizes, with representative blocks being indicated at 40a, 40b, 40c and 40d with increasing size. In accordance with the sub-division of FIG. 2a, the sample array 20 is firstly divided into a regular two-dimensional arrangement of tree blocks 40d which, in turn, have individual sub-division information associated therewith according to which a certain tree block 40d may be further sub-divided according to a quadtree structure or not. The tree block to the left of block 40d is exemplarily sub-divided into smaller blocks in accordance with a quadtree structure. The encoder 10 may perform one two-dimensional transform for each of the blocks shown with solid and dashed lines in FIG. 2a. In other words, encoder 10 may transform the array 20 in units of the block subdivision.

Instead of a quadtree-based sub-division a more general multi tree-based sub-division may be used and the number of child nodes per hierarchy level may differ between different hierarchy levels.

FIG. 2b shows another example for a sub-division. In accordance with FIG. 2b, the sample array 20 is firstly divided into macroblocks 40b arranged in a regular two-dimensional arrangement in a non-overlapping mutually abutting manner wherein each macroblock 40b has associated therewith sub-division information according to which a macroblock is not sub-divided, or, if subdivided, sub-divided in a regular two-dimensional manner into equally-sized sub-blocks so as to achieve different sub-division granularities for different macroblocks. The result is a sub-division of the sample array 20 in differently-sized blocks 40 with representatives of the different sizes being indicated at 40a, 40b and 40a'. As in FIG. 2a, the encoder 10 performs a two-dimensional transform on each of the blocks shown in FIG. 2b with the solid and dashed lines. FIG. 2c will be discussed later.

Figure 3:
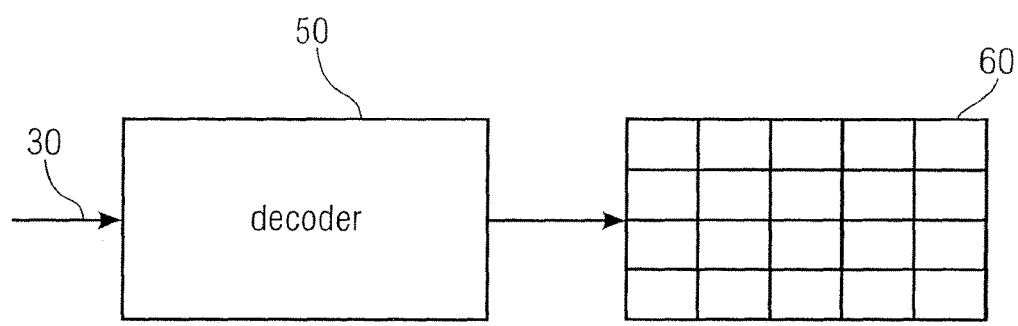
FIG. 3 shows a block diagram of a decoder according to an embodiment.

FIG. 3 shows a decoder 50 being able to decode the data stream 30 generated by encoder 10 to reconstruct a reconstructed version 60 of the sample array 20. Decoder 50 extracts from the data stream 30 the transform coefficient block for each of the blocks 40 and reconstructs the reconstructed version 60 by performing an inverse transform on each of the transform coefficient blocks.

Encoder 10 and decoder 50 may be configured to perform entropy encoding/decoding in order to insert the information on the transform coefficient blocks into, and extract this information from the data stream, respectively. Details in this regard are described later. It should be noted that the data stream 30 not necessarily comprises information on transform coefficient blocks for all the blocks 40 of the sample array 20. Rather, as sub-set of blocks 40 may be coded into the bitstream 30 in another way. For example, encoder 10 may decide to refrain from inserting a transform coefficient block for a certain block of blocks 40 with inserting into the bitstream 30 alternative coding parameters instead which enable the decoder 50 to predict or otherwise fill the respective block in the reconstructed version 60. For example, encoder 10 may perform a texture analysis in order to locate blocks within sample array 20 which may be filled at the decoder side by decoder by way of texture synthesis and indicate this within the bitstream accordingly.

Figure 4:
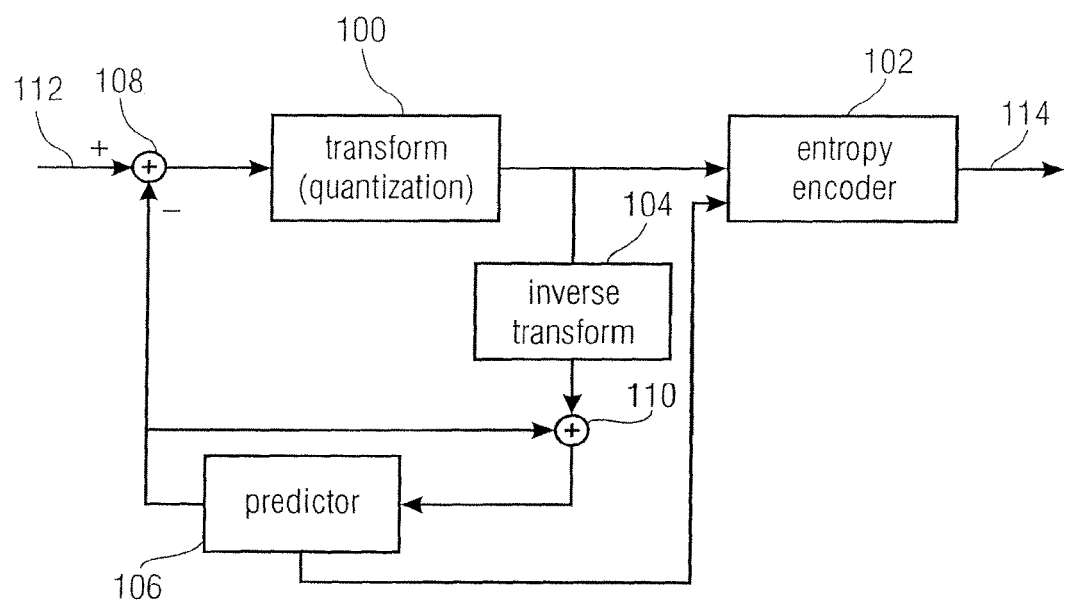
FIG. 4 shows a block diagram of an encoder according to an embodiment of the present application in more detail.

As discussed in the following Figures, the transform coefficient blocks not necessarily represent a spectral domain representation of the original information samples of a respective block 40 of the sample array 20. Rather, such a transform coefficient block may represent a spectral domain representation of a prediction residual of the respective block 40. FIG. 4 shows an embodiment for such an encoder. The encoder of FIG. 4 comprises a transform stage 100, an entropy coder 102, an inverse transform stage 104, a predictor 106 and a subtractor 108 as well as an adder 110. Subtractor 108, transform stage 100 and entropy coder 102 are serially connected in the order mentioned between an input 112 and an output 114 of the encoder of FIG. 4. The inverse transform stage 104, adder 110 and predictor 106 are connected in the order mentioned between the output of transform stage 100 and the inverting input of subtractor 108, with the output of predictor 106 also being connected to a further input of adder 110.

The coder of FIG. 4 is a predictive transform-based block coder. That is, the blocks of a sample array 20 entering input 112 are predicted from previously encoded and reconstructed portions of the same sample array 20 or previously coded and reconstructed other sample arrays which may precede or succeed the current sample array 20 in time. The prediction is performed by predictor 106. Subtractor 108 subtracts the prediction from such a original block and the transform stage 100 performs a two-dimensional transformation on the prediction residuals. The two-dimensional transformation itself or a subsequent measure inside transform stage 100 may lead to a quantization of the transformation coefficients within the transform coefficient blocks. The quantized transform coefficient blocks are losslessly coded by, for example, entropy encoding within entropy encoder 102 with the resulting data stream being output at output 114. The inverse transform stage 104 reconstructs the quantized residual and adder 110, in turn, combines the reconstructed residual with the corresponding prediction in order to obtain reconstructed information samples based on which predictor 106 may predict the afore-mentioned currently encoded prediction blocks. Predictor 106 may use different prediction modes such as intra prediction modes and inter prediction modes in order to predict the blocks and the prediction parameters are forwarded to entropy encoder 102 for insertion into the data stream.

That is, in accordance with the embodiment of FIG. 4, the transform coefficient blocks represent a spectral representation of a residual of the sample array rather than actual information samples thereof.

It should be noted that several alternatives exist for the embodiment of FIG. 4 with some of them having been described within the introductory portion of the specification which description is incorporated into the description of FIG. 4 herewith. For example, the prediction generated by predictor 106 may not be entropy encoded. Rather, the side information may be transferred to the decoding side by way of another coding scheme.

Figure 5:
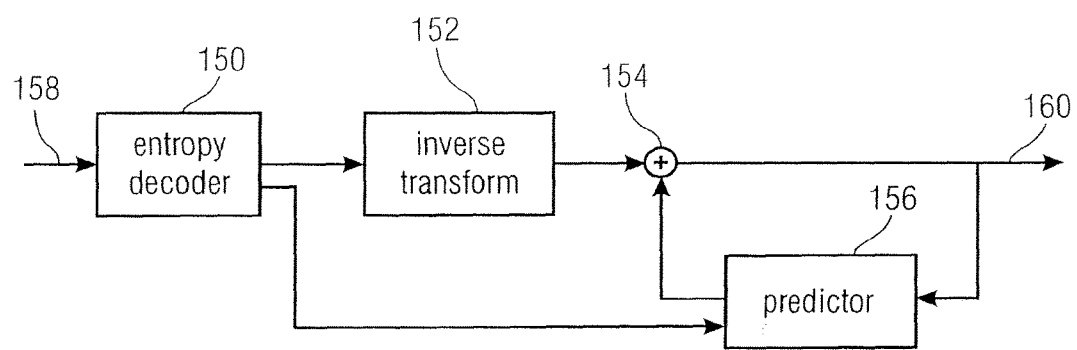
FIG. 5 shows a block diagram of a decoder according to an embodiment of the present application in more detail.

FIG. 5 shows a decoder able to decode a data stream generated by the encoder of FIG. 4. The decoder of FIG. 5 comprises an entropy decoder 150, an inverse transform stage 152, an adder 154 and a predictor 156. Entropy decoder 150, inverse transform stage 152, and adder 154 are serially connected between an input 158 and an output 160 of the decoder of FIG. 5 in the order mentioned. A further output of entropy decoder 150 is connected to predictor 156 which, in turn, is connected between the output of adder 154 and a further input thereof. The entropy decoder 150 extracts, from the data stream entering the decoder of FIG. 5 at input 158, the transform coefficient blocks wherein an inverse transform is applied to the transform coefficient blocks at stage 152 in order to obtain the residual signal. The residual signal is combined with a prediction from predictor 156 at adder 154 so as to obtain a reconstructed block of the reconstructed version of the sample array at output 160. Based on the reconstructed versions, predictor 156 generates the predictions thereby rebuilding the predictions performed by predictor 106 at the encoder side. In order to obtain the same predictions as those used at the encoder side, predictor 156 uses the prediction parameters which the entropy decoder 150 also obtains from the data stream at input 158.

It should be noted that in the above-described embodiments, the spatial granularity at which the prediction and the transformation of the residual is performed, do not have to be equal to each other. This is shown in FIG. 2C. This figure shows a sub-division for the prediction blocks of the prediction granularity with solid lines and the residual granularity with dashed lines. As can be seen, the subdivisions may be selected by the encoder independent from each other. To be more precise, the data stream syntax may allow for a definition of the residual subdivision independent from the prediction subdivision. Alternatively, the residual subdivision may be an extension of the prediction subdivision so that each residual block is either equal to or a proper subset of a prediction block. This is shown on FIG. 2a and FIG. 2b, for example, where again the prediction granularity is shown with solid lines and the residual granularity with dashed lines. This, in FIG. 2a-2c, all blocks having a reference sign associated therewith would be residual blocks for which one two-dimensional transform would be performed while the greater solid line blocks encompassing the dashed line blocks 40a, for example, would be prediction blocks for which a prediction parameter setting is performed individually.

Figure 6:
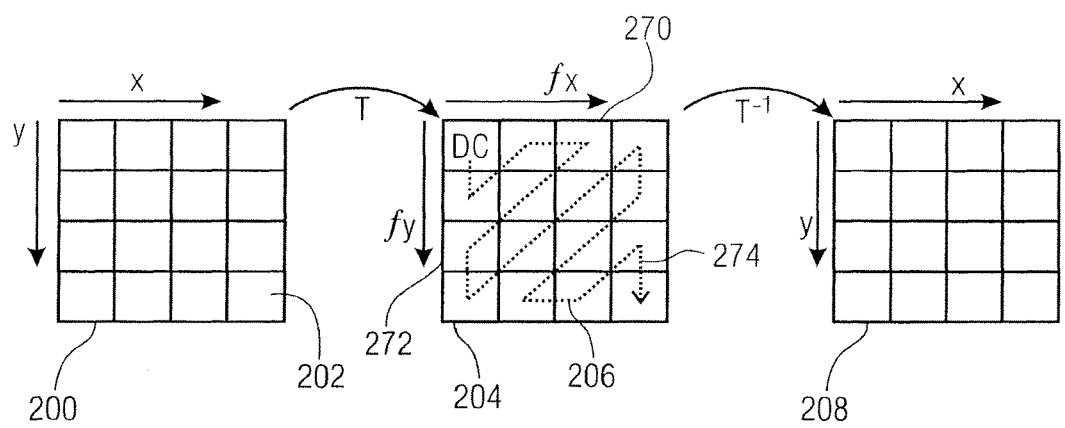
FIG. 6 schematically illustrates a transform of a block from spatial domain into spectral domain.

The above embodiments have in common that a block of (residual or original) samples is to be transformed at the encoder side into a transform coefficient block which, in turn, is to be inverse transformed into a reconstructed block of samples at the decoder side. This is illustrated in FIG. 6. FIG. 6 shows a block of samples 200. In case of FIG. 6, this block 200 is exemplarily quadratic and 4×4 samples 202 in size. The samples 202 are regularly arranged along a horizontal direction x and vertical direction y. By the abovementioned two-dimensional transform T, block 200 is transformed into spectral domain, namely into a block 204 of transform coefficients 206, the transform block 204 being of the same size as block 200. That is, transform block 204 has as many transform coefficients 206 as block 200 has samples, in both horizontal direction and vertical direction. However, as transform T is a spectral transformation, the positions of the transform coefficients 206 within transform block 204 do not correspond to spatial positions but rather to spectral components of the content of block 200. In particular, the horizontal axis of transform block 204 corresponds to an axis along which the spectral frequency in the horizontal direction monotonically increases while the vertical axis corresponds to an axis along which the spatial frequency in the vertical direction monotonically increases wherein the DC component transform coefficient is positioned in a corner—here exemplarily the top left corner—of block 204 so that at the bottom right-hand corner, the transform coefficient 206 corresponding to the highest frequency in both horizontal and vertical direction is positioned. Neglecting the spatial direction, the spatial frequency to which a certain transform coefficient 206 belongs, generally increases from the top left corner to the bottom right-hand corner. By an inverse transform $T^{-1}$, the transform block 204 is re-transferred from spectral domain to spatial domain, so as to re-obtain a copy 208 of block 200. In case no quantization/loss has been introduced during the transformation, the reconstruction would be perfect.

As already noted above, it may be seen from FIG. 6 that greater block sizes of block 200 increase the spectral resolution of the resulting spectral representation 204. On the other hand, quantization noise tends to spread over the whole block 208 and thus, abrupt and very localized objects within blocks 200 tend to lead to deviations of the re-transformed block relative to the original block 200 due to quantization noise. The main advantage of using greater blocks is, however, that the ratio between the number of significant, i.e. non-zero (quantized) transform coefficients on the one hand and the number of insignificant transform coefficients on the other hand may be decreased within larger blocks compared to smaller blocks thereby enabling a better coding efficiency. In other words, frequently, the significant transform coefficients, i.e. the transform coefficients not quantized to zero, are distributed over the transform block 204 sparsely. Due to this, in accordance with the embodiments described in more detail below, the positions of the significant transform coefficients is signaled within the data stream by way of a significance map. Separately therefrom, the values of the significant transform coefficient, i.e., the transform coefficient levels in case of the transform coefficients being quantized, are transmitted within the data stream.

Figure 7:
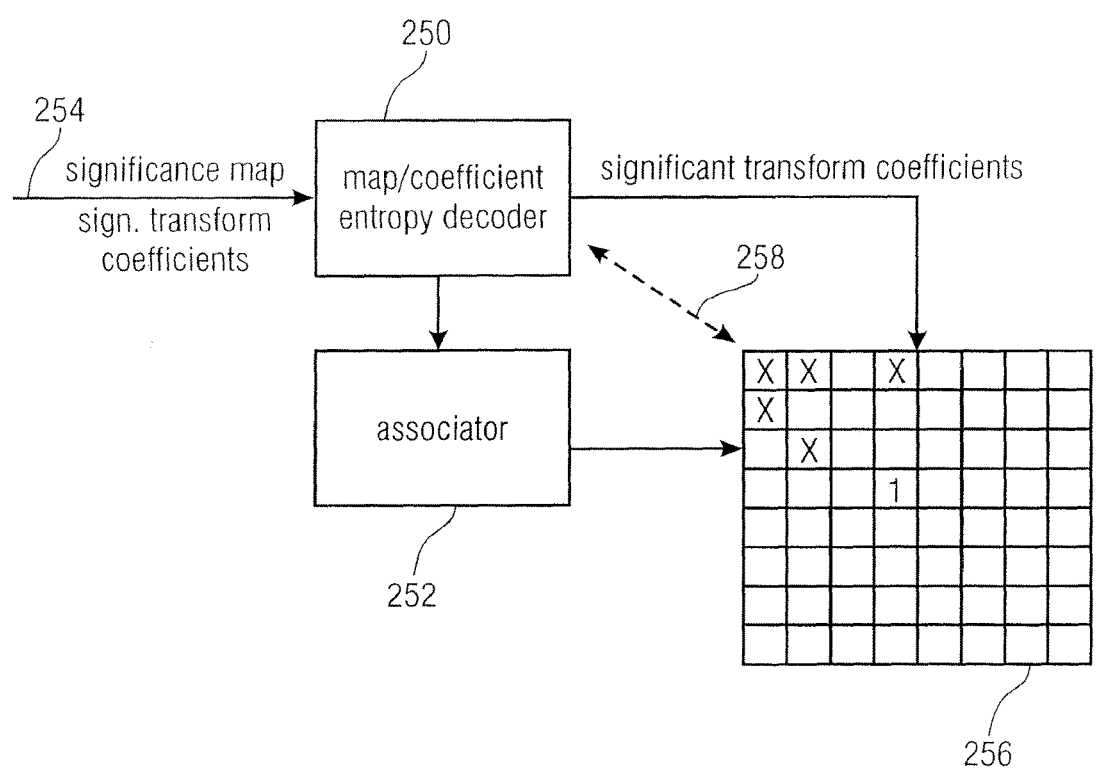
FIG. 7 shows a block diagram of an apparatus for decoding the significance map and the significant transform coefficients of a transform coefficient block in accordance with an embodiment.

Accordingly, according to an embodiment of the present application, an apparatus for decoding such a significance map from the data stream or for decoding the significance map along the corresponding significant transform coefficient values from the data stream, may be implemented as shown in FIG. 7, and each of the entropy decoders mentioned above, namely decoder 50 and entropy decoder 150, may comprise the apparatus shown in FIG. 7.

The apparatus of FIG. 7 comprises a map/coefficient entropy decoder 250 and an associator 252. The map/coefficient entropy decoder 250 is connected to an input 254 at which syntax elements representing the significance map and the significant transform coefficient values enter. As will be described in more detail below, different possibilities exist with respect to the order in which the syntax elements describing the significance map on the one hand and the significant transform coefficient values on the other hand enter map/coefficient entropy decoder 250. The significance map syntax elements may precede the corresponding levels, or both may be interleaved. However, preliminary it is assumed that the syntax elements representing the significance map precede the values (levels) of the significant transform coefficients so that the map/coefficient entropy decoder 250 firstly decodes the significance map and then the transform coefficient levels of the significant transform coefficients.

As map/coefficient entropy decoder 250 sequentially decodes the syntax elements representing the significance map and the significant transform coefficient values, the associator 252 is configured to associate these sequentially decoded syntax elements/values to the positions within the transform block 256. The scan order in which the associator 252 associates the sequentially decoded syntax elements representing the significance map and levels of the significant transform coefficients to the positions of the transform block 256 follows a one-dimensional scan order among the positions of the transform block 256 which is identical to the order used at the encoding side to introduce these elements into the data stream. As will also be outlined in more detail below, the scan order for the significance map syntax elements may be equal to the order used for the significant coefficient values, or not.

The map/coefficient entropy decoder 250 may access the information on the transform block 256 available so far, as generated by the associator 252 up to a currently to be decoded syntax element/level, in order to set probability estimation context for entropy decoding the syntax element/level currently to be decoded as indicated by a dashed line 258. For example, associator 252 may log the information gathered so far from the sequentially associated syntax elements such as the levels itself or the information as to whether at the respective position a significant transform coefficient is situated or not or as to whether nothing is known about the respective position of the transform block 256 wherein the map/coefficient entropy decoder 250 accesses this memory. The memory just mentioned is not shown in FIG. 7 but the reference sign 256 may also indicate this memory as the memory or log buffer would be for storing the preliminary information obtained by associator 252 and entropy decoder 250 so far. Accordingly, FIG. 7 illustrates by crosses positions of significant transform coefficients obtained from the previously decoded syntax elements representing the significance map and a "1" shall indicate that the significant transform coefficient level of the significant transform coefficient at the respective position has already been decoded and is 1. In case of the significance map syntax elements preceding the significant values in the data stream, a cross would have been logged into memory 256 at the position of the "1" (this situation would have represented the whole significance map) before entering the "1" upon decoding the respective value.

The following description concentrates on specific embodiments for coding the transform coefficient blocks or the significance map, which embodiments are readily transferable to the embodiments described above. In these embodiments, a binary syntax element coded_block_flag may be transmitted for each transform block, which signals whether the transform block contains any significant transform coefficient level (i.e., transform coefficients that are non-zero). If this syntax element indicates that significant transform coefficient levels are present, the significance map is coded, i.e. merely then. The significance map specifies, as indicated above, which of the transform coefficient levels have non-zero values. The significance map coding involves a coding of binary syntax elements significant_coeff_flag each specifying for a respectively associated coefficient position whether the corresponding transform coefficient level is not equal to zero. The coding is performed in a certain scan order which may change during the significance map coding dependent on the positions of significant coefficients identified to be significant so far, as will be described in more detail below. Further, the significance map coding involves a coding of binary syntax elements last significant_coeff_flag interspersed with the sequence of significant_coeff_flag at the positions thereof, where significant_coeff_flag signals a significant coefficient. If the significant_coeff_flag bin is equal to one, i.e., if a non-zero transform coefficient level exists at this scanning position, the further binary syntax element last significant_coeff_flag is coded. This bin indicates if the current significant transform coefficient level is the last significant transform coefficient level inside the block or if further significant transform coefficient levels follow in scanning order. If last significant_coeff_flag indicates that no further significant transform coefficients follow, no further syntax elements are coded for specifying the significance map for the block. Alternatively, the number of significant coefficient positions could be signaled within the data stream in advance of the coding of the sequence of significant_coeff_flag. In the next step, the values of the significant transform coefficient levels are coded. As described above, alternatively, the transmission of the levels could be interleaved with the transmission of the significance map. The values of significant transform coefficient levels are coded in a further scanning order for which examples are described below. The following three syntax elements are used. The binary syntax element coeff_abs_greater_one indicates if the absolute value of the significant transform coefficient level is greater than one. If the binary syntax element coeff_abs_greater_one indicates that the absolute value is greater than one, a further syntax element coeff_abs_level_minus_one is sent, which specifies the absolute value of the transform coefficient level minus one. Finally, the binary syntax element coeff_sign_flag, which specifies the sign of the transform coefficient value, is coded for each significant transform coefficient level.

The embodiments described below enable to further reduce the bit rate and thus increase the coding efficiency. In order to do so, these embodiments use a specific approach for context modelling for syntax elements related to the transform coefficients. In particular, a new context model selection for the syntax elements significant_coeff_flag, last significant_coeff_flag, coeff_abs_greater_one and coeff_abs_level_minus_one is used. And furthermore, an adaptive switching of the scan during the encoding/decoding of the significance map (specifying the locations of non-zero transform coefficient levels) is described. As to the meaning of the must-mentioned syntax elements, reference is made to the above introductory portion of the present application.

The coding of the significant_coeff_flag and the last significant_coeff_flag syntax elements, which specify the significance map, is improved by an adaptive scan and a new context modelling based on a defined neighborhood of already coded scan positions. These new concepts result in a more efficient coding of significance maps (i.e., a reduction of the corresponding bit rate), in particular for large block sizes.

One aspect of the below-outlined embodiments is that the scan order (i.e., the mapping of a block of transform coefficient values onto an ordered set (vector) of transform coefficient levels) is adapted during the encoding/decoding of a significance map based on the values of the already encoded/decoded syntax elements for the significance map.

In an embodiment, the scan order is adaptively switched between two or more predefined scan pattern. In an embodiment, the switching can take place only at certain predefined scan positions. In a further embodiment of the invention, the scan order is adaptively switched between two predefined scan patterns. In an embodiment, the switching between the two predefined scan patterns can take place only at certain predefined scan positions.

The advantage of the switching between scan patterns is a reduced bit rate, which is a result of a smaller number of coded syntax elements. As an intuitive example and referring to FIG. 6, it is often the case that significant transform coefficient values—in particular for large transform blocks—are concentrated at one of the block borders 270, 272, because the residual blocks contain mainly horizontal or vertical structures. With the mostly used zig-zag scan 274, there exists a probability of about 0.5 that the last diagonal sub-scan of the zig-zag scan in which the last significant coefficient is encountered starts from the side at which the significant coefficients are not concentrated. In that case, a large number of syntax elements for transform coefficient levels equal to zero have to be coded before the last non-zero transform coefficient value is reached. This can be avoided if the diagonal sub-scans are started at the side, where the significant transform coefficient levels are concentrated.

More details for an embodiment of the invention are described below.

As mentioned above, also for large block sizes, it is advantageous to keep the number of context models reasonably small in order to enable a fast adaptation of the context models and providing a high coding efficiency. Hence, a particular context should be used for more than one scan position. But the concept of assigning the same context to a number of successive scan positions, as done for 8×8 blocks in H.264, is usually not suitable, since the significant transform coefficient levels are usually concentrated in certain areas of a transform blocks (this concentration may be a result of certain dominant structures that are usually present in, for example residual blocks). For designing the context selection, one could use the above mentioned observation that significant transform coefficient levels are often concentrated in certain areas of a transform block. In the following, concepts are described by which this observation can be exploited.

In one embodiment, a large transform block (e.g., greater than 8×8) is partitioned into a number of rectangular sub-blocks (e.g., into 16 sub-blocks) and each of these sub-blocks is associated with a separate context model for coding the significant_coeff_flag and last significant_coeff_flag (where different context models are used for the significant_coeff_flag and last significant_coeff_flag). The partitioning into sub-blocks can be different for the significant_coeff_flag and last significant_coeff_flag. The same context model may be used for all scan positions that are located in a particular sub-block.

In a further embodiment, a large transform block (e.g., greater than 8×8) may be partitioned into a number of rectangular and/or non-rectangular sub-regions and each of these sub-regions is associated with a separate context model for coding the significant_coeff_flag and/or the last significant_coeff_flag. The partitioning into sub-regions can be different for the significant_coeff_flag and last significant_coeff_flag. The same context model is used for all scan positions that are located in a particular sub-region.

In a further embodiment, the context model for coding the significant_coeff_flag and/or the last significant_coeff_flag is selected based on the already coded symbols in a predefined spatial neighborhood of the current scan position. The predefined neighborhood can be different for different scan positions. In an embodiment, the context model is selected based on the number of significant transform coefficient levels in the predefined spatial neighborhood of the current scan position, where only already coded significance indications are counted.

More details for an embodiment of the invention are described below.

As mentioned above, for large block sizes, the conventional context modelling encodes a large number of bins (that usually have different probabilities) with one single context model for the coeff_abs_greater_one and coeff_abs_level_minus_one syntax elements. In order to avoid this drawback for large block size, large blocks may, in accordance with an embodiment, be divided into small quadratic or rectangular sub-blocks of a particular size and a separate context modelling is applied for each sub-block. In addition, multiple sets of context models may be used, where one of these context model sets is selected for each sub-block based on an analysis of the statistics of previously coded sub-blocks. In an embodiment invention, the number of transform coefficients greater than 2 (i.e. coeff_abs_level_minus_1>1) in the previously coded sub-block of the same block is used to derive the context model set for the current sub-block. These enhancements for context modelling of the coeff_abs_greater_one and coeff_abs_level_minus_one syntax elements result in a more efficient coding of both syntax elements, in particular for large block sizes. In an embodiment, the block size of a sub-block is 2×2. In another embodiment, the block size of a sub-block is 4×4.

In a first step, a block larger than a predefined size may be divided into smaller sub-blocks of a particular size. The coding process of the absolute transform coefficient levels maps the quadratic or rectangular block of sub-blocks onto an ordered set (vector) of sub-blocks using a scan, where different scans can be used for different blocks. In an embodiment, the sub-blocks are processed using a zig-zag scan; the transform coefficient levels inside a sub-block are processed in a reverse zig-zag scan, i.e. a scan loading from a transform coefficient belonging to the highest frequency in vertical and horizontal direction to the coefficient relating to the lowest frequency in both directions. In another embodiment of the invention, a reversed zig-zag scan is used for coding the sub-blocks and for coding the transform coefficient levels inside the sub-blocks. In another embodiment of the invention, the same adaptive scan that is used for coding the significance map (see above) is used to process the whole block of transform coefficient levels.

The division of a large transform block into sub-blocks avoids the problem of using just one context model for most of the bins of a large transform block. Inside the sub-blocks, the state-of-the-art context modelling (as specified in H.264) or a fixed context can be used, depending on the actual size of the sub-blocks. Additionally, the statistics (in terms of probability modelling) for such sub-blocks are different from the statistics of a transform block with the same size. This property may be exploited by extending the set of context models for the coeff_abs_greater_one and coeff_abs_level_minus_one syntax elements. Multiple sets of context models can be provided, and for each sub-block one of these context model sets may be selected based on the statistics of previously coded sub-block in current transform block or in previously coded transform blocks. In an embodiment of the invention, the selected set of context models is derived based on the statistics of the previously coded sub-blocks in the same block. In another embodiment of the invention, the selected set of context models is derived based on the statistics of the same sub-block of previously coded blocks. In an embodiment, the number of context model sets is set equal to 4, while in another embodiment, the number of context model sets is set equal to 16. In an embodiment, the statistics that are used for deriving the context model set is the number of absolute transform coefficient levels greater than 2 in previously coded sub-blocks. In another embodiment, the statistics that are used for deriving the context model set is the difference between the number of significant coefficients and the number of transform coefficient levels with an absolute value greater than 2.

The coding of the significance map may be performed as outlined below, namely by an adaptive switching of the scan order.

Figure 8:
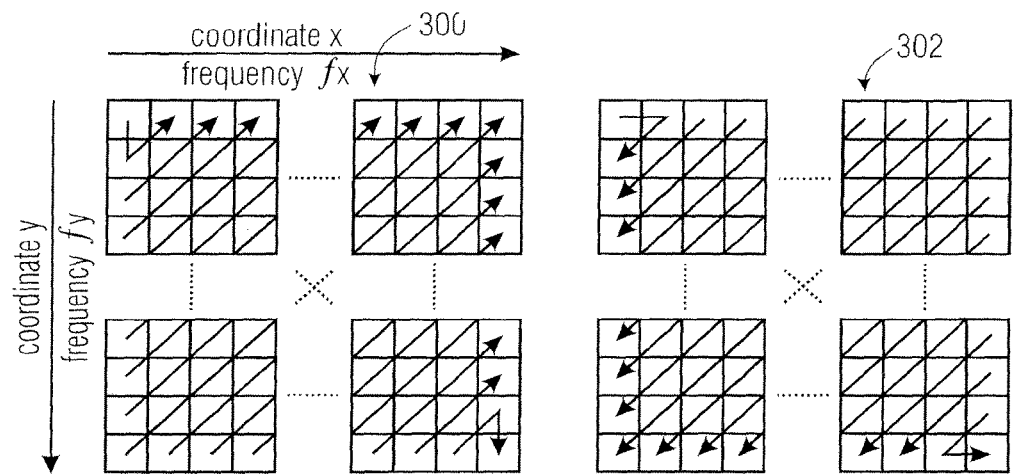
FIG. 8 schematically illustrates a sub-partitioning of a scan order into sub-paths and their different traversal directions.

In an embodiment, the scanning order for coding the significance map is adapted by switching between two predefined scan patterns. The switching between the scan patterns can only be done at certain predefined scan positions. The decision whether the scanning pattern is switched depends on the values of the already coded/decoded significance map syntax elements. In an embodiment, both predefined scanning patterns specify scanning patterns with diagonal sub-scans, similar to the scanning pattern of the zig-zag scan. The scan patterns are illustrated in FIG. 8. Both scanning patterns 300 and 302 consist of a number of diagonal sub-scans for diagonals from bottom-left to top-right or vice versa. The scanning of the diagonal sub-scans (not illustrated in the figure) is done from top-left to bottom-right for both predefined scanning patterns. But the scanning inside the diagonal sub-scans is different (as illustrated in the figure). For the first scanning pattern 300, the diagonal sub-scans are scanned from bottom-left to top-right (left illustration of FIG. 8), and for the second scanning pattern 302, the diagonal sub-scans are scanned from top-right to bottom-left (right illustration of FIG. 8). In an embodiment, the coding of the significance map starts with the second scanning pattern. While coding/decoding the syntax elements, the number of significant transform coefficient values is counted by two counters $C_1$ and Ca. The first counter $C_1$ counts the number of significant transform coefficients that are located in the bottom-left part of the transform block; i.e., this counter is incremented by one when a significant transform coefficient level is coded/decoded for which the horizontal coordinate x inside the transform block is less than the vertical coordinate y. The second counter $C_2$ counts the number of significant transform coefficients that are located in the top-right part of the transform block; i.e., this counter is incremented by one when a significant transform coefficient level is coded/decoded for which the horizontal coordinate x inside the transform block is greater than the vertical coordinate y. The adaptation of the counters may be performed by associator 252 in FIG. 7 and can be described by the following formulas, where t specifies the scan position index and both counters are initialized with zero:

$$C_1(t+1) = \begin{cases} 1+C_1(t), & x<y \\ C_1(t), & \text{otherwise} \end{cases}$$

$$C_2(t+1) = \begin{cases} 1+C_2(t), & x>y \\ C_2(t), & \text{otherwise} \end{cases}$$

At the end of each diagonal sub-scan, it is decided by the associator 252 whether the first or the second of the predefined scanning patterns 300, 302 is used for the next diagonal sub-scan. This decision is based on the values of the counters $c_1$ and $c_2$. When the counter for the bottom-left part of the transform block is greater than the counter for the bottom-left part, the scanning pattern that scans the diagonal sub-scans from bottom-left to top-right is used; otherwise (the counter for the bottom-left part of the transform block is less than or equal to the counter for the bottom-left part), the scanning pattern that scans the diagonal sub-scans from top-right to bottom-left is used. This decision can be expressed by the following formula:

$$d_{t+1} = \begin{cases} \text{top right to left bottom,} & C_1 \leq C_2 \\ \text{left bottom to top right,} & C_1 > C_2 \end{cases}$$

It should be noted that the above described embodiment of the invention can be easily applied to other scanning patterns. As an example, the scanning pattern that is used for field macroblocks in H.264 can also be decomposed into sub-scans. In a further embodiment, a given but arbitrary scanning pattern is decomposed into sub-scans. For each of the sub-scans, two scanning patterns are defined: one from bottom-left to top-right and one from top-right to bottom-left (as basic scan direction). In addition, two counters are introduced which count the number of significant coefficients in a first part (close to the bottom-left border of a transform blocks) and a second part (close to the top-right border of a transform blocks) inside the sub-scans. Finally, at the end of each sub-scan it is decided (based on the values of the counters), whether the next sub-scan is scanned from bottom-left to top-right or from top-right to bottom-left.

In the following, embodiments for as to how entropy decoder 250 models the contexts, are presented.

In one embodiment, the context modelling for the significant_coeff_flag is done as follows. For 4×4 blocks, the context modelling is done as specified in H.264. For 8×8 blocks, the transform block is decomposed into 16 sub-blocks of 2×2 samples, and each of these sub-blocks is associated with a separate context. Note that this concept can also be extended to larger block sizes, a different number of sub-blocks, and also non-rectangular sub-regions as described above.

Figure 9:
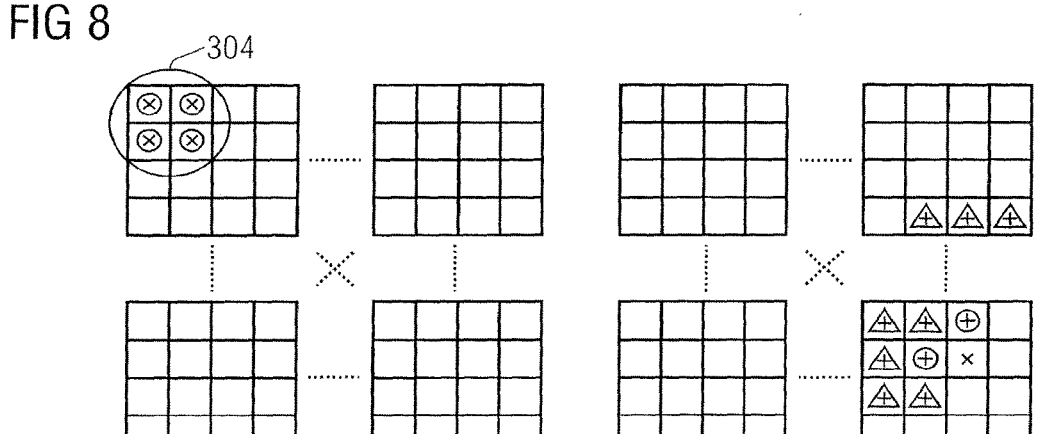
FIG. 9 schematically illustrates neighborhood definitions for certain scan positions within a transform block in accordance with an embodiment.

In a further embodiment, the context model selection for larger transform blocks (e.g., for blocks greater than 8×8) is based on the number of already coded significant transform coefficients in a predefined neighborhood (inside the transform block). An example for the definition of neighborhoods, which corresponds to an embodiment of the invention, is illustrated in FIG. 9. Crosses with a circle around same are available neighbors, which are taken into account for the evaluation and crosses with a triangle are neighbors which are evaluated depending on the current scan position and current scan direction):

If the current scan position lies in the inside the 2×2 left corner 304, a separate context model is used for each scan position (FIG. 9, left illustration).

If the current scan position does not lie inside the 2×2 left corner and is not located on the first row or the first column of the transform block, then the neighbors illustrated on the right in FIG. 9 are used for evaluating the number of significant transform coefficients in the neighborhood of the current scan position "x" without anything around it.

Figure 10:
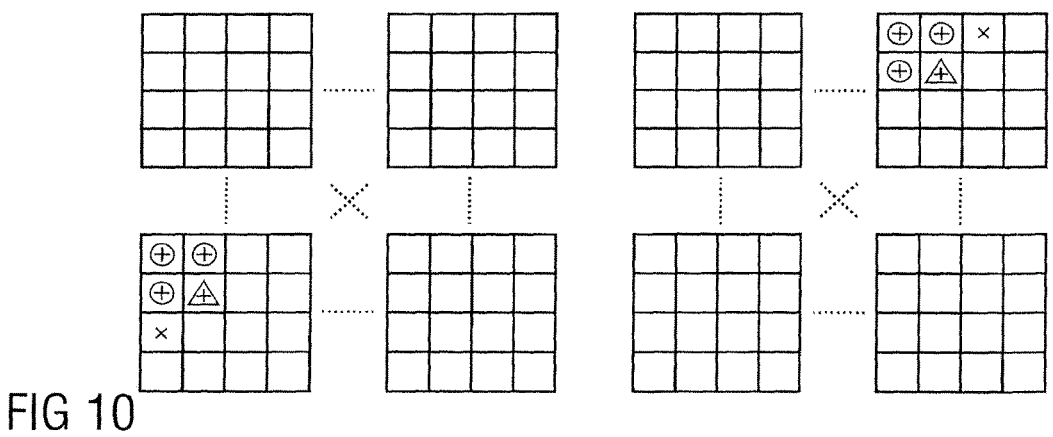
FIG. 10 schematically illustrates possible neighborhood definitions for some scan positions within transform blocks lying at the border of a transform block.

If the current scan position "x" without anything around it falls into the first row of the transform block, then the neighbors specified in the right illustration of FIG. 10 are used.

If the current scan position "x" falls in to the first column of the block, then the neighbors specified in the left illustration of FIG. 10 are used.

In other words, the decoder 250 may be configured to sequentially extract the significance map syntax elements by context-adaptively entropy decoding by use of contexts which are individually selected for each of the significance map syntax elements depending on a number of positions at which according to the previously extracted and associated significance map syntax elements significant transform coefficients are situated, the positions being restricted to ones lying in a neighborhood of the position ("x" in FIG. 9 right-hand side and FIG. 10 both sides, and any of the marked positions of the left hand side of FIG. 9) with which the respective current significance map syntax element is associated. As shown, the neighborhood of the position with which the respective current syntax element is associated, may merely comprise positions either directly adjacent to or separated from the position with which the respective significance map syntax element is associated, at one position in vertical direction and/or one position in the horizontal direction at the maximum. Alternatively, merely positions directly adjacent to the respective current syntax element may be taken into account. Concurrently, the size of the transform coefficient block may be equal to or greater than 8×8 positions.

In an embodiment, the context model that is used for coding a particular significant_coeff_flag is chosen depending on the number of already coded significant transform coefficient levels in the defined neighborhoods. Here, the number of available context models can be smaller than the possible value for the number of significant transform coefficient levels in the defined neighborhood. The encoder and decoder can contain a table (or a different mapping mechanism) for mapping the number of significant transform coefficient levels in the defined neighborhood onto a context model index.

In a further embodiment, the chosen context model index depends on the number of significant transform coefficient levels in the defined neighborhood and on one or more additional parameters as the type of the used neighborhood or the scan position or a quantized value for the scan position.

For the coding of the last significant_coeff_flag, a similar context modelling as for the significant_coeff_flag can be used. However, the probability measure for the last significant_coeff_flag mainly depends on a distance of the current scan position to the top-left corner of the transform block. In an embodiment, the context model for coding the last significant_coeff_flag is chosen based on the scan diagonal on which the current scan position lies (i.e., it is chosen based on x+y, where x and y represent the horizontal and vertical location of a scan position inside the transform block, respectively, in case of the above embodiment of FIG. 8, or based on how many sub-scans by between the current sub-scan and the upper left DC position (such as sub-scan index minus 1)). In an embodiment of the invention, the same context is used for different values of x+y. The distance measure i.e. x+y or the sub-scan index is mapped on the set of context models in a certain way (e.g. by quantizing x+y or the sub-san index), where the number of possible values for the distance measure is greater than the number of available context models for coding the last significant_coeff_flag.

In an embodiment, different context modelling schemes are used for different sizes of transform blocks.

In the following the coding of the absolute transform coefficient levels is described.

In one embodiment, the size of sub-blocks is 2×2 and the context modelling inside the sub-blocks is disabled, i.e., one single context model is used for all transform coefficients inside a 2×2 sub-block. Only blocks larger than 2×2 may be affected by the subdivision process. In a further embodiment of this invention, the size of the sub-blocks is 4×4 and the context modelling inside the sub-blocks is done as in H.264; only blocks larger than 4×4 are affected by the subdivision process.

Figure 11:
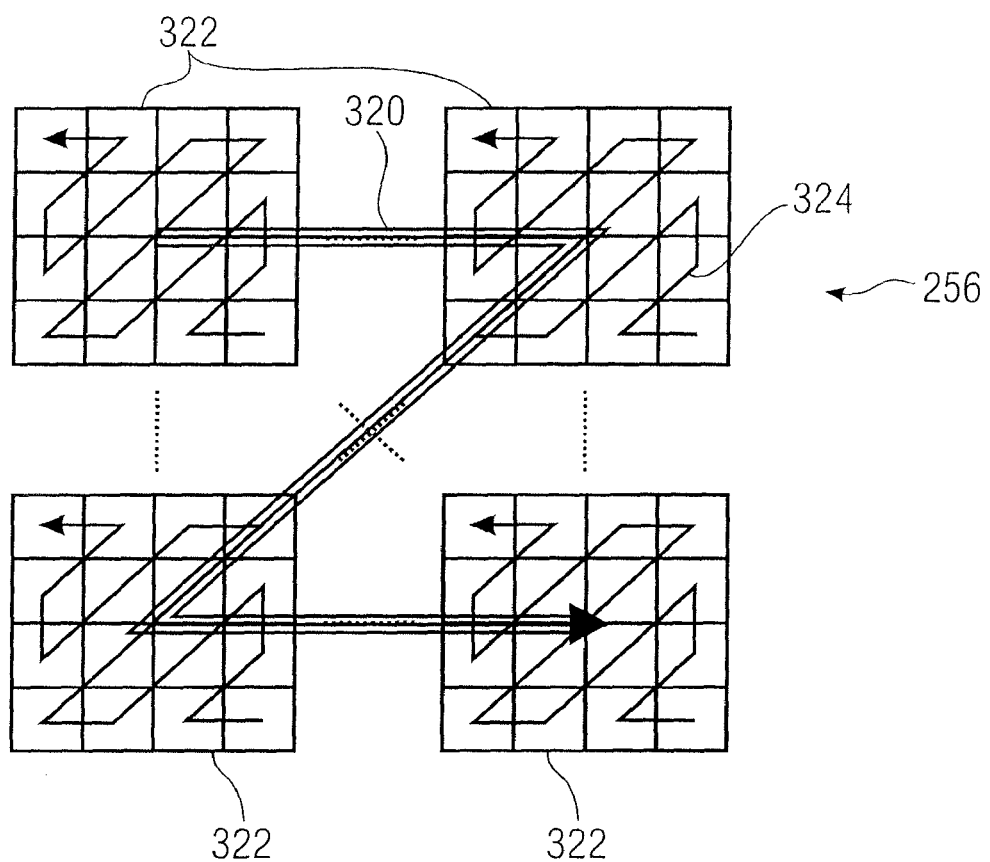
FIG. 11 shows a possible scan of transform blocks in accordance with a further embodiment of the present application.

As to the scan order, in an embodiment, a zig-zag scan 320 is employed for scanning the sub-blocks 322 of a transform block 256 i.e. along a direction of substantially increasing frequency, while the transform coefficients inside a sub-block are scanned in a reverse zig-zag scan 326 (FIG. 11). In a further embodiment of the invention, both the sub-blocks 322 and the transform coefficient levels inside the sub-blocks 322 are scanned using a reverse zig-zag scan (like the illustration in FIG. 11, where the arrow 320 is inversed). In another embodiment, the same adaptive scan as for coding the significance map is used to process the transform coefficient levels, where the adaptation decision is the same, so that exactly the same scan is used for both the coding of the significance map and the coding of the transform coefficient level values. It should be noted that the scan itself does usually not depend on the selected statistics or the number of context model sets or on the decision for enabling or disabling the context modelling inside the sub-blocks.

Next embodiments for context modelling for the coefficient levels are described.

In an embodiment, the context modelling for a sub-block is similar to the context modelling for 4×4 blocks in H.264 as has been described above. The number of context models that are used for coding the coeff_abs_greater_one syntax element and the first bin of the coeff_abs_level_minus_one syntax element is equal to five, with, for example, using different sets of context models for the two syntax elements. In a further embodiment, the context modelling inside the sub-blocks is disabled and only one predefined context model is used inside each sub-block. For both embodiments, the context model set for a sub-block 322 is selected among a predefined number of context model sets. The selection of the context model set for a sub-block 322 is based on certain statistics of one or more already coded sub-blocks. In an embodiment, the statistics used for selecting a context model set for a sub-block are taken from one or more already coded sub-blocks in the same block 256. How the statistics are used to derive the selected context model set is described below. In a further embodiment, the statistics are taken from the same sub-block in a previously coded block with the same block size such as block 40a and 40a' in FIG. 2b. In another embodiment of the invention, the statistics are taken from a defined neighbouring sub-block in the same block, which depends on the selected scan for the sub-blocks. Also, it is important to note that the source of the statistics should be independent from the scan order and how the statistics are created to derive the context model set.

In an embodiment, the number of context model sets is equal to four, while in another embodiment, the number of context model sets is equal to 16. Commonly, the number of context model sets is not fixed and should be adapted in accordance with the selected statistics. In an embodiment, the context model set for a sub-block 322 is derived based on the number of absolute transform coefficient levels greater than two in one or more already coded sub-blocks. An index for the context model set is determined by mapping the number of absolute transform coefficient levels greater than two in the reference sub-block or reference sub-blocks onto a set of predefined context model indices. This mapping can be implemented by quantizing the number of absolute transform coefficient levels greater than two or by a predefined table. In a further embodiment, the context model set for a sub-block is derived based on the difference between the number of significant transform coefficient levels and the number of absolute transform coefficient levels greater than two in one or more already coded sub-blocks. An index for the context model set is determined by mapping this difference onto a set of predefined context model indices. This mapping can be implemented by quantizing the difference between the number of significant transform coefficient levels and the number of absolute transform coefficient levels greater than two or by a predefined table.

In another embodiment, when the same adaptive scan is used for processing the absolute transform coefficient levels and the significance map, the partial statistics of the sub-blocks in the same blocks may be used to derive the context model set for the current sub-block, or; if available, the statistics of previously coded sub-blocks in previously coded transform blocks may be used. That means, for example, instead of using the absolute number of absolute transform coefficient levels greater than two in the sub-block(s) for deriving the context model, the number of already coded absolute transform coefficient levels greater than two multiplied by the ratio of the number of transform coefficients in the sub-block(s) and the number of already coded transform coefficients in the sub-block(s) is used; or instead of using the difference between the number of significant transform coefficient levels and the number of absolute transform coefficient levels greater than two in the sub-block(s), the difference between the number of already coded significant transform coefficient levels and the number of already coded absolute transform coefficient levels greater than two multiplied by the ratio of the number of transform coefficients in the sub-block(s) and the number of already coded transform coefficients in the sub-block(s) is used.

For the context modelling inside the sub-blocks, basically the inverse of the state-of-the-art context modelling for H.264 may be employed. That means, when the same adaptive scan is used for processing the absolute transform coefficient levels and the significance map, the transform coefficient levels are basically coded in a forward scan order, instead of a reverse scan order as in H.264. Hence, the context model switching have to be adapted accordingly. According to one embodiment, the coding of the transform coefficients levels starts with a first context model for coeff_abs_greater_one and coeff_abs_level_minus_one syntax elements, and it is switched to the next context model in the set when two coeff_abs_greater_one syntax elements equal to zero have been coded since the last context model switch. In other words, the context selection is dependent on the number of already coded coeff_abs_greater_one syntax elements greater than zero in scan order. The number of context models for coeff_abs_greater_one and for coeff_abs_level_minus_one may be the same as in H.264.

Thus, the above embodiments may be applied to the field of digital signal processing and, in particular, to image and video decoders and encoders. In particular, the above embodiments enable a coding of syntax elements related to transform coefficients in block-based image and video codecs, with an improved context modelling for syntax elements related to transform coefficients that are coded with an entropy coder that employs a probability modelling. In comparison to the state-of-the-art, an improved coding efficiency is achieved in particular for large transform blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive encoded signal for representing the transform block or the significance map, respectively, can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for decoding a significance map encoded in a data stream, wherein the significance map indicates positions of significant transform coefficients within a transform coefficient block, the apparatus comprising:
 a decoder configured to extract first-type syntax elements from the data stream, wherein each of the first-type syntax elements at least indicates, for an associated position within the transform coefficient block, whether a significant transform coefficient is present; and
 an associator configured to associate each of the extracted first-type syntax elements with a respective associated position within the transform coefficient block in a scan order, wherein the scan order is determined with respect to the transform coefficient block and based on prior positions of significant transform coefficients indicated by prior first-type syntax elements previously extracted.

2. The apparatus according to claim 1, wherein the decoder is further configured to determine, based on information extracted from the data stream and independent of a statistic associated with insignificant transform coefficients, whether at a current position having a significant transform coefficient is where a last significant transform coefficient is in the transform coefficient block.

3. The apparatus according to claim 1, wherein the decoder is further configured to extract, from the data stream with respect to a current position of the transform coefficient block, a second-type syntax element indicating whether the current position is where the last significant transform coefficient is in the transform coefficient block.

4. The apparatus according to claim 1, wherein the decoder is further configured to extract from the data stream, subsequent to extraction of at least one of the first-type syntax elements, information related to the significant transform coefficients within the transform coefficient block,
wherein the associator is configured to associate the extracted significant transform coefficients with their respective positions in the transform coefficient block in a coefficient scan order, by which the transform coefficient block is scanned in sub-blocks of the transform coefficient block in accordance with a sub-block scan order, and the transform coefficients within the sub-blocks are scanned in a position sub-scan order.

5. The apparatus according to claim 1, wherein the decoder is configured to extract the first-type syntax elements based on context-adaptive entropy decoding using contexts selected for the first-type syntax elements, wherein a context for a current first-type syntax element being decoded is determined based on a number of positions, in a neighborhood with respect to the position of the current first-type syntax element, that are associated with significant transform coefficients indicated by prior first-type syntax elements previously extracted.

6. The apparatus according to claim 5, wherein the neighborhood comprises at least one position horizontally and/or vertically adjacent to the current first-type syntax element.

7. The apparatus according to claim 5, wherein the decoder is further configured to map the number of positions to a context index pointing to a set of possible context indices.

8. The apparatus according to claim 1, wherein the associator is further configured to associate the extracted first-type syntax elements with positions of the transform coefficient block along a sequence of sub-paths wherein the sub-paths are located at positions having increasing distances from a position of the lowest frequency in both the vertical and horizontal directions, and wherein the associator is configured to determine a direction of each of the sub-paths, along which the extracted first-type syntax elements are associated with the positions of the transform coefficient block, based on a number of positions of the significant transform coefficients along a previous sub-path.

9. The apparatus according to claim 1, wherein the data stream comprises at least a portion associated with color samples.

10. The apparatus according to claim 1, wherein the data stream comprises at least a portion associated with depth values related to a depth map.

11. A method for decoding a significance map encoded in a data stream, wherein the significance map indicates positions of significant transform coefficients within a transform coefficient block, the method comprising:
extracting first-type syntax elements from the data stream, wherein each of the first-type syntax elements at least indicates, for an associated position within the transform coefficient block, whether a significant transform coefficient is present; and
associating each of the extracted first-type syntax elements with a respective associated position within the transform coefficient block in a scan order, wherein the scan order is determined with respect to the transform coefficient block and based on prior positions of significant transform coefficients indicated by prior first-type syntax elements previously extracted.

12. The method according to claim 11, further comprising determining, based on information extracted from the data stream and independent of a statistic associated with insignificant transform coefficients, whether at a current position having a significant transform coefficient is where a last significant transform coefficient is in the transform coefficient block.

13. The method according to claim 11, further comprising extracting, from the data stream, with respect to a current position of the transform coefficient block, a second-type syntax element indicating whether the current position is where the last significant transform coefficient is in the transform coefficient block.

14. The method according to claim 11, wherein the data stream comprises at least a portion associated with color samples.

15. The method according to claim 11, wherein the data stream comprises at least a portion associated with depth values related to a depth map.

16. The method according to claim 11, further comprising extracting from the data stream, subsequent to extraction of at least one of the first-type syntax elements, information related to the significant transform coefficients within the transform coefficient block; and
associating the extracted significant transform coefficients with their respective positions in the transform coefficient block in a coefficient scan order, by which the transform coefficient block is scanned in sub-blocks of the transform coefficient block in accordance with a sub-block scan order, and the transform coefficients within the sub-blocks are scanned in a position sub-scan order.

17. The method according to claim 11, further comprising extracting the first-type syntax elements based on context-adaptive entropy decoding using contexts selected for the first-type syntax elements, wherein a context for a current first-type syntax element being decoded is determined based on a number of positions, in a neighborhood with respect to the position of the current first-type syntax element, that are associated with significant transform coefficients indicated by prior first-type syntax elements previously extracted.

18. The method according to claim 17, wherein the neighborhood comprises at least one position horizontally and/or vertically adjacent to the current first-type syntax element.

19. The method according to claim 17, further comprising mapping the number of positions to a context index pointing to a set of possible context indices.

20. The method according to claim 11, further comprising associating the extracted first-type syntax elements with positions of the transform coefficient block along a sequence of sub-paths wherein the sub-paths are located at positions having increasing distances from a position of the lowest frequency in both the vertical and horizontal directions; and
Determining a direction of each of the sub-paths, along which the extracted first-type syntax elements are associated with the positions of the transform coefficient block, based on a number of positions of the significant transform coefficients along a previous sub-path.

21. An apparatus for encoding a significance map indicating positions of significant transform coefficients within a transform coefficient block into a data stream, wherein the apparatus is configured to code first-type syntax elements into the data stream by entropy encoding, wherein each of the first-type syntax elements at least indicates, for an associated position within the transform coefficient block, whether a significant transform coefficient is present,
  the apparatus being configured to code each of the first-type syntax elements with a respective associated position within the transform coefficient block in a scan order, wherein the scan order is determined with respect to the transform coefficient block and based on prior positions of significant transform coefficients indicated by prior first-type syntax elements previously encoded.

22. The apparatus according to claim 21, wherein the apparatus is further configured to code, independent of a statistic of insignificant transform coefficients, whether at a current position associated with a significant transform coefficient a last significant transform coefficient in the transform coefficient block is situated.

23. The apparatus according to claim 21, wherein the apparatus is further configured to code, with respect to a current position of the transform coefficient block, a second-type syntax element indicating whether the current position is where the last significant transform coefficient is in the transform coefficient block.

24. The apparatus according to claim 21, wherein the data stream comprises at least a portion associated with color samples.

25. The apparatus according to claim 21, wherein the data stream comprises at least a portion associated with depth values related to a depth map.

26. A non-transitory computer-readable medium for storing data associated with a video, comprising:
  a data stream stored in the non-transitory computer-readable medium, the data stream comprising therein an encoded significance map indicating positions of significant transform coefficients within a transform coefficient block, wherein first-type syntax elements are coded into the data stream by entropy encoding, the first-type syntax elements at least indicating, for an associated position within the transform coefficient block, whether a significant transform coefficient is present, wherein each of the first-type syntax elements with a respective associated position within the transform coefficient block is coded in a scan order, the scan order being determined with respect to the transform coefficient block and based on prior positions of significant transform coefficients indicated by prior first-type syntax elements previously encoded.

27. The computer-readable medium according to claim 26, further comprising encoded information indicating, independent of a statistic of insignificant transform coefficients, whether at a current position associated with a significant transform coefficient a last significant transform coefficient in the transform coefficient block is situated.

28. The computer-readable medium according to claim 26, further comprising an encoded a second-type syntax element indicating information about a last significant transform coefficient in the transform coefficient block.

29. The computer-readable medium according to claim 26, wherein the data stream comprises at least a portion associated with color samples.

30. The computer-readable medium according to claim 26, wherein the data stream comprises at least a portion associated with depth values related to a depth map.

* * * * *